(12) United States Patent
Matsuura et al.

(10) Patent No.: US 11,769,274 B2
(45) Date of Patent: Sep. 26, 2023

(54) IMAGE PROCESSING APPARATUS, METHOD AND STORAGE MEDIUM, FOR OBJECT COLOR EVALUATION

(71) Applicant: CANON KABUSHIKI KAISHA, Tokyo (JP)

(72) Inventors: Takahiro Matsuura, Inagi (JP); Yoshitaka Sasaki, Kawasaki (JP); Chika Inoshita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 17/024,333

(22) Filed: Sep. 17, 2020

(65) Prior Publication Data

US 2021/0004987 A1 Jan. 7, 2021

Related U.S. Application Data

(63) Continuation of application No. PCT/JP2019/010439, filed on Mar. 14, 2019.

(30) Foreign Application Priority Data

Mar. 30, 2018 (JP) .................. 2018-066926
Dec. 7, 2018 (JP) .................. 2018-230316

(51) Int. Cl.
*G06F 3/14* (2006.01)
*G06T 7/00* (2017.01)
*G06T 7/90* (2017.01)

(52) U.S. Cl.
CPC ............... *G06T 7/90* (2017.01); *G06T 7/001* (2013.01); *G06F 3/14* (2013.01); *G06T 2207/30164* (2013.01)

(58) Field of Classification Search
CPC ... G06F 3/14; G06T 7/001; G06T 7/90; G06T 2207/30164
See application file for complete search history.

(56) References Cited

U.S. PATENT DOCUMENTS

| 4,985,283 A | * | 1/1991 | Ogata | ................... B05B 5/0407 118/631 |
| 5,852,675 A | * | 12/1998 | Matsuo | ................ H04N 1/6033 382/167 |
| 7,013,042 B1 | | 3/2006 | Yamada et al. | ................ 382/167 |

(Continued)

FOREIGN PATENT DOCUMENTS

| CN | 1732696 A | * | 2/2006 | ........... H04N 1/6027 |
| CN | 105074439 A | * | 11/2015 | ............. G01B 11/24 |

(Continued)

OTHER PUBLICATIONS

International Search Report and Written Opinion in parent PCT/JP2019/010439.

*Primary Examiner* — Yubin Hung
(74) *Attorney, Agent, or Firm* — Venable LLP

(57) ABSTRACT

An image processing apparatus according to the present invention including a first acquisition unit configured to acquire color information of a first object obtained by capturing an image of the first object illuminated with light emitted by a light source, a second acquisition unit configured to acquire color information of a second object based on a condition determined by a direction of capturing the image of the first object, a direction of illuminating the first object with light from the light source, and a direction of a normal of the first object, and an output unit configured to output information according to the color information of the first object and the color information of the second object.

16 Claims, 24 Drawing Sheets

(56) References Cited

U.S. PATENT DOCUMENTS

| | | | |
|---|---|---|---|
| 7,577,289 B2 | 8/2009 | Matsuura | 382/162 |
| 7,697,781 B2 | 4/2010 | Matsuura | 382/274 |
| 7,751,618 B2 | 7/2010 | Matsuura | 382/167 |
| 8,559,710 B2 | 10/2013 | Sasaki | 382/167 |
| 8,988,449 B2 * | 3/2015 | Sasaki | G06T 15/06 |
| | | | 345/589 |
| 9,019,294 B2 | 4/2015 | Matsuura | 345/590 |
| 2003/0046019 A1 * | 3/2003 | Kumada | H04N 1/6055 |
| | | | 702/127 |
| 2003/0161530 A1 | 8/2003 | Yamada et al. | 382/167 |
| 2004/0174433 A1 * | 9/2004 | Uchino | H04N 1/6077 |
| | | | 348/207.99 |
| 2005/0071101 A1 * | 3/2005 | Nishimura | H01L 21/67288 |
| | | | 702/83 |
| 2008/0292178 A1 * | 11/2008 | Sones | G06T 7/0004 |
| | | | 382/152 |
| 2009/0053410 A1 * | 2/2009 | Salatin | B05D 7/574 |
| | | | 427/202 |
| 2014/0146169 A1 * | 5/2014 | Ollivier | G01N 21/88 |
| | | | 348/131 |
| 2015/0245009 A1 * | 8/2015 | Tozuka | A61B 5/1032 |
| | | | 433/29 |
| 2016/0259992 A1 * | 9/2016 | Knodt | G06F 18/22 |
| 2019/0011377 A1 * | 1/2019 | Bonardi | G01B 11/245 |
| 2021/0004988 A1 | 1/2021 | Seto | G06T 5/006 |

FOREIGN PATENT DOCUMENTS

| | | |
|---|---|---|
| JP | H11-232430 | 8/1999 |
| JP | H11-304589 | 11/1999 |
| JP | 2002-063567 | 2/2002 |
| JP | 2006131002 A * | 5/2006 |
| JP | 2007-248072 | 9/2007 |
| JP | 2007248072 A * | 9/2007 |
| JP | 2014-035261 | 2/2014 |
| JP | 2016-161297 | 9/2016 |
| JP | 2016-164559 | 9/2016 |

\* cited by examiner (a)

(b)

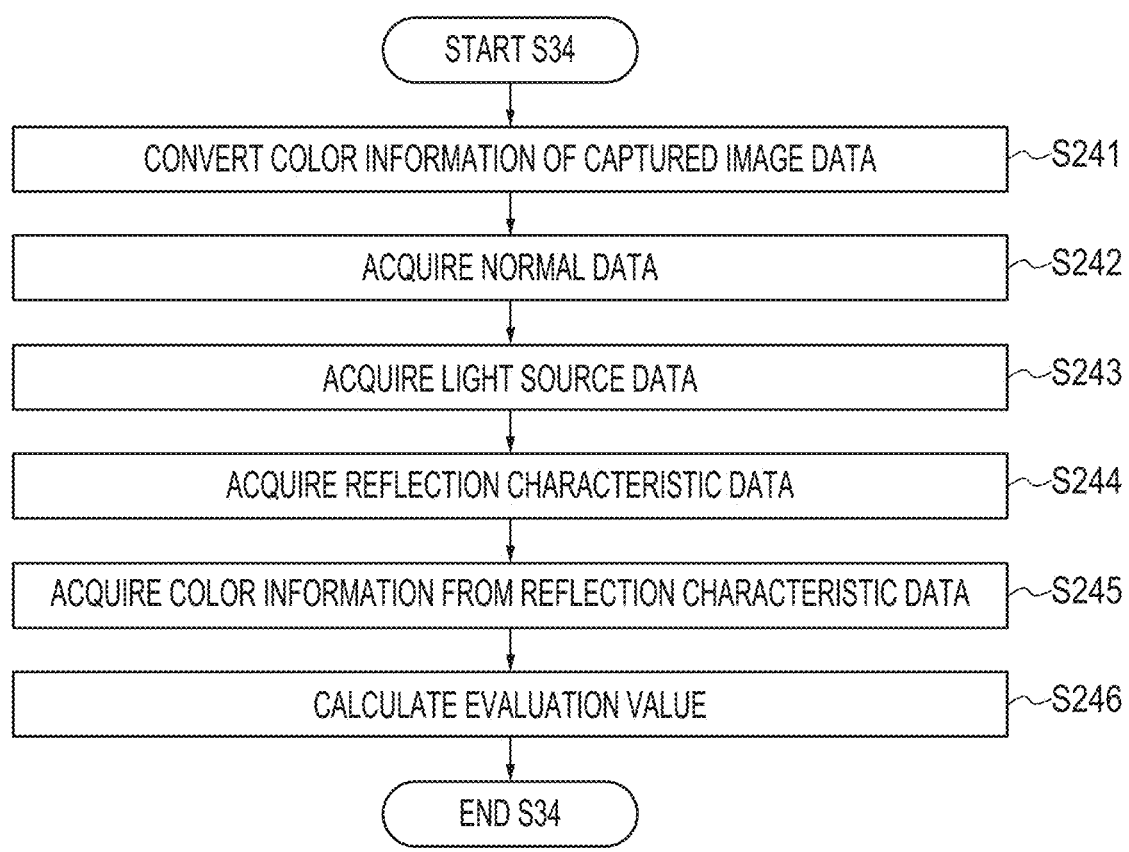

FIG. 10A
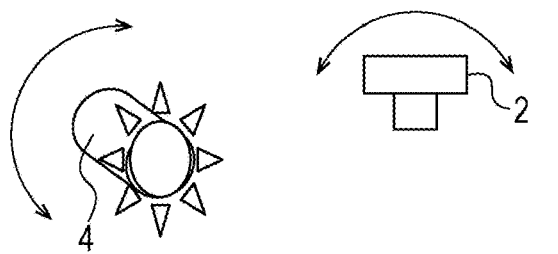
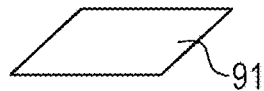
FIG. 10B
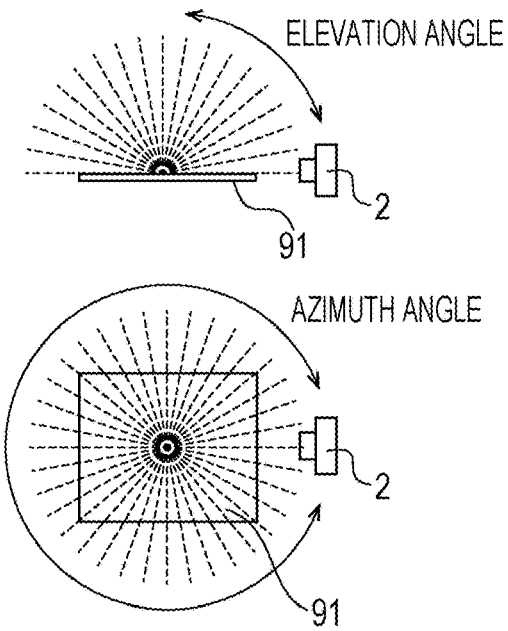
FIG. 10C
| LIGHT SOURCE | | IMAGE CAPTURING APPARATUS | | REFLECTION CHARACTERISTIC | | |
|---|---|---|---|---|---|---|
| AZIMUTH ANGLE | ELEVATION ANGLE | AZIMUTH ANGLE | ELEVATION ANGLE | R | G | B |
| 0 | 0 | 0 | 0 | ## | ## | ## |
| 0 | 0 | 0 | 10 | ## | ## | ## |
|  |  |  |  |  |  |  |
| 0 | 0 | 0 | 80 | ## | ## | ## |
|  |  |  |  |  |  |  |
| 350 | 80 | 350 | 80 | ## | ## | ## |

FIG. 12
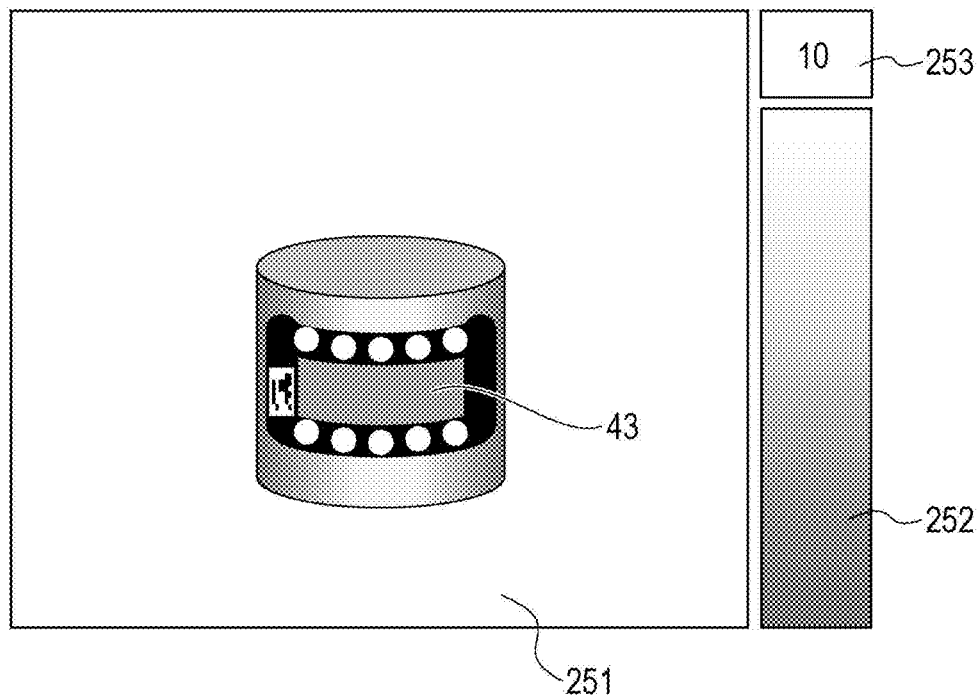
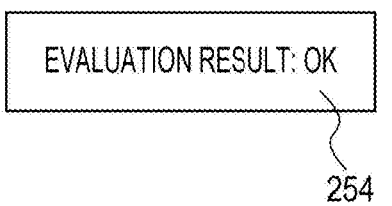
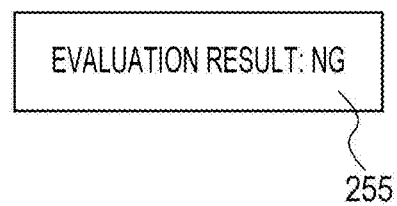
FIG. 13A
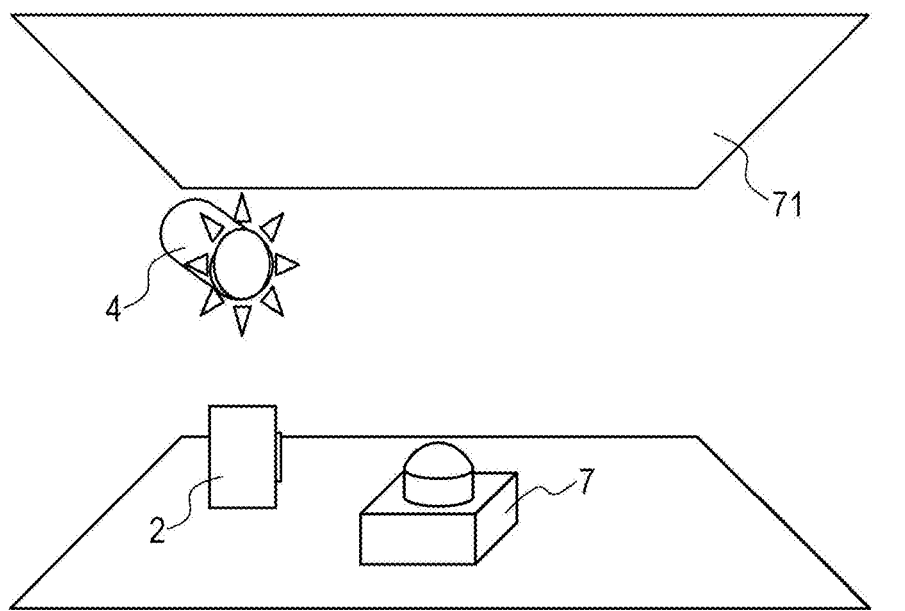

| POLYGON No | VERTEX 1 | | | VERTEX 2 | | | VERTEX 3 | | |
|---|---|---|---|---|---|---|---|---|---|
| | X | Y | Z | X | Y | Z | X | Y | Z |
| 1 | # # | # # | # # | # # | # # | # # | # # | # # | # # |
| 2 | # # | # # | # # | # # | # # | # # | # # | # # | # # |
| 3 | # # | # # | # # | # # | # # | # # | # # | # # | # # |
| | | | | | | | | | |
| # # | # # | # # | # # | # # | # # | # # | # # | # # | # # |

| LIGHT SOURCE | | SPECTRAL RADIANCE METER | | REFLECTION CHARACTERISTIC | | | |
|---|---|---|---|---|---|---|---|
| AZIMUTH ANGLE | ELEVATION ANGLE | AZIMUTH ANGLE | ELEVATION ANGLE | 380 | 390 | ... | 730 |
| 0 | 0 | 0 | 0 | ## | ## | | ## |
| 0 | 0 | 0 | 10 | ## | ## | | ## |
| | | | | | | | |
| 0 | 0 | 0 | 80 | ## | ## | | ## |
| | | | | | | | |
| 350 | 80 | 350 | 80 | ## | ## | | ## |

| STANDARD PLATE | | REFLECTANCE CHARACTERISTIC | | |
|---|---|---|---|---|
| AZIMUTH ANGLE | ELEVATION ANGLE | R | G | B |
| -90 | -90 | ## | ## | ## |
| -90 | -80 | ## | ## | ## |
|  |  |  |  |  |
| -90 | 90 | ## | ## | ## |
|  |  |  |  |  |
| 0 | 0 | ## | ## | ## |
|  |  |  |  |  |
| 90 | 90 | ## | ## | ## |

IMAGE PROCESSING APPARATUS, METHOD AND STORAGE MEDIUM, FOR OBJECT COLOR EVALUATION

CROSS-REFERENCE TO RELATED APPLICATIONS

This application is a Continuation of International Patent Application No. PCT/JP2019/010439, filed Mar. 14, 2019, which claims the benefit of Japanese Patent Application No. 2018-066926, filed Mar. 30, 2018 and Japanese Patent Application No. 2018-230316, filed Dec. 7, 2018, all of which are hereby incorporated by reference herein in their entirety.

BACKGROUND OF THE INVENTION

Field of the Invention

The present invention relates to an image processing technique for evaluating a color of an object.

Background Art

It has been known to evaluate a color of an imaging target object by using a captured image acquired from a digital camera. PTL 1 discloses a technique for inspecting a difference in color texture by comparing a chromaticity distribution of an inspection object obtained by imaging with a chromaticity distribution of a reference object.

In evaluating a color of an object by capturing an image of the object, the color of the object may vary depending on a shape of the object and an image capturing condition. In a conventional technique such as that disclosed in PTL 1, there is a problem that an evaluated color changes when at least one of the shape of the object and the image capturing condition changes.

In view of the above problem, it is an object of the present invention to provide a process of evaluating a color of an object without being influenced by a shape of the object or an image capturing condition.

CITATION LIST

Patent Literature

PTL 1: Japanese Patent Laid-Open No. 2016-164559

SUMMARY OF THE INVENTION

To solve the above-described problem, the present invention provides an image processing apparatus including a first acquisition unit configured to acquire color information of a first object obtained by capturing an image of the first object illuminated with light emitted by a light source, a second acquisition unit configured to acquire color information of a second object based on a condition determined by a direction of capturing the image of the first object, a direction of illuminating the first object with light from the light source, and a direction of a normal of the first object, and an output unit configured to output information according to the color information of the first object and the color information of the second object.

Further features of the present invention will become apparent from the following description of exemplary embodiments with reference to the attached drawings.

BRIEF DESCRIPTION OF THE DRAWINGS

FIG. 9 is a flowchart illustrating a process of evaluating a color of an object.
FIG. 10A is a diagram for explaining reflection characteristic data.
FIG. 10B is a diagram for explaining reflection characteristic data.
FIG. 10C is a diagram for explaining reflection characteristic data.
FIG. 12 is a diagram illustrating an example of a displayed evaluation result.
FIG. 13A is a diagram for explaining a method of generating light source data.

DESCRIPTION OF THE EMBODIMENTS

Embodiments of the present invention are described below with reference to drawings. Note that the following embodiments do not necessarily limit the present invention. Also note that all combinations of features described in the embodiments are not essential to the solving units of the present invention.

First Embodiment

<Configuration of Color Evaluation System>

Figure 1A:
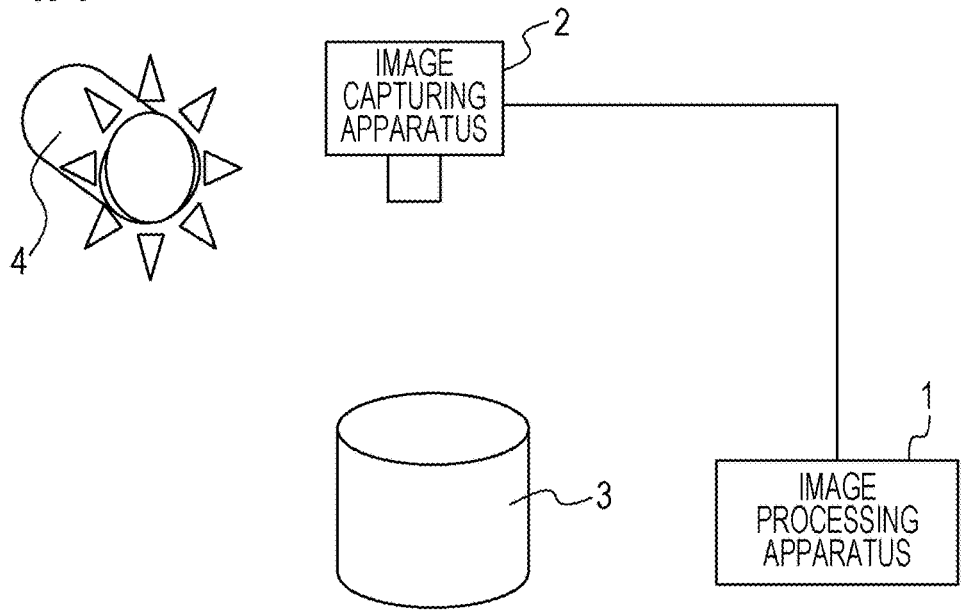
FIG. 1A is a diagram illustrating a configuration of color evaluation system.

FIG. 1A is a diagram illustrating a configuration of a color evaluation system according to an embodiment. The color evaluation system includes an image processing apparatus 1 and an image capturing apparatus 2.

The image capturing apparatus 2 includes a lens and an area sensor such as a CMOS sensor including 4000×2000 pixels, and generates image data of an image including pixels each of which has color information indicating a red (R) value, a green (G) value, and a blue (B) value each represented by 8 bits and thus represented by a total of 24 bits. The image capturing apparatus 2 may be any camera as long as it can acquire a two-dimensional distribution of color information of an imaging target object. The number of colors, the bit depth, the number of pixels, etc. are not limited to the above examples. A light source 4 is a light source for illuminating an object 3.

Figure 1B:
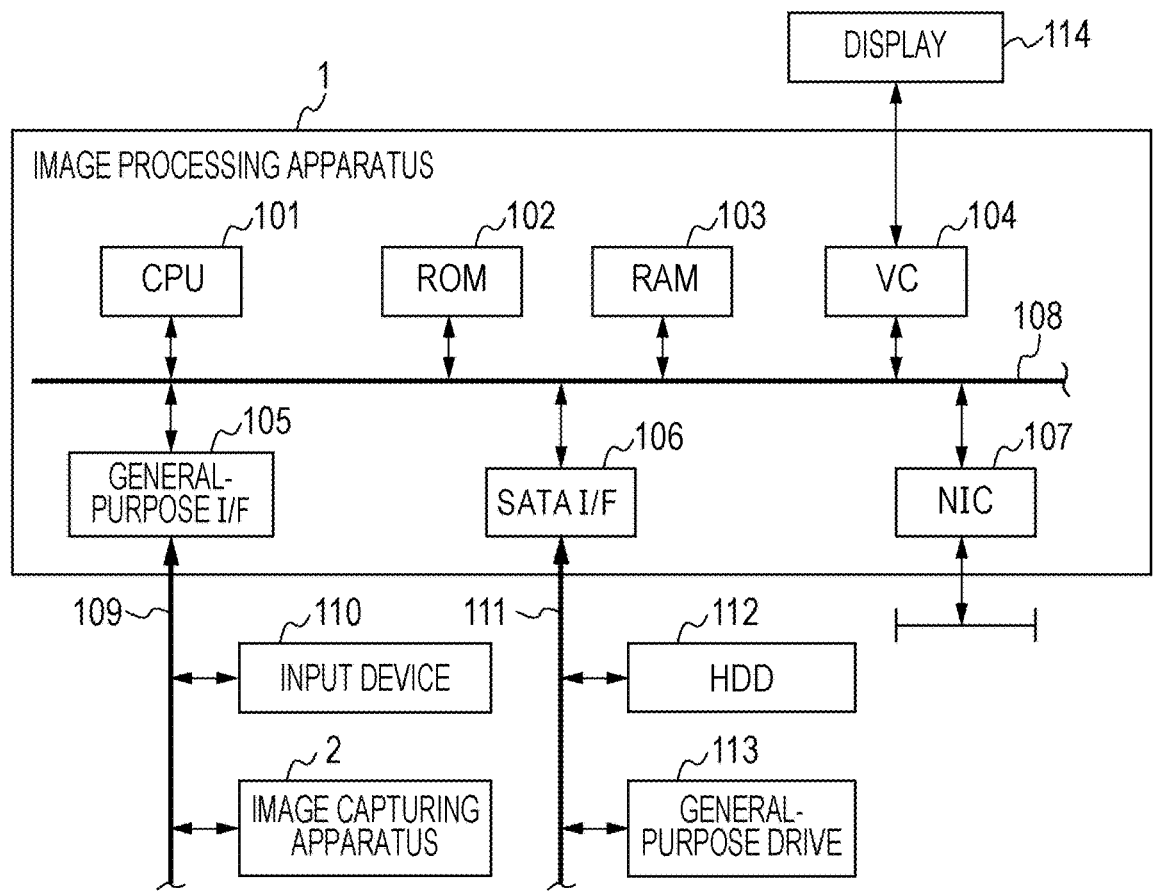
FIG. 1B is a diagram illustrating a configuration of color evaluation system.

FIG. 1B is a block diagram illustrating a hardware configuration of the image processing apparatus 1. The image processing apparatus 1 includes a CPU 101, a ROM 102, and a RAM 103. The image processing apparatus 1 also includes a VC (video card) 104, a general-purpose I/F (interface) 105, a SATA (serial ATA) I/F 106, and a NIC (network interface card) 107. The CPU 101 executes an OS (operating system) and various programs stored in the ROM 102, an HDD (hard disk drive) 112, or the like using the RAM 103 as a work memory. Furthermore, the CPU 101 controls each component via a system bus 108. Note that processes in flowcharts described below are executed by the CPU 101 by loading the program code stored in the ROM 102, the HDD 112, or the like into the RAM 103 and executing the loaded program code. A display 114 is connected to the VC 104. The general-purpose I/F 105 is connected to an input device 110 such as a mouse or a keyboard and the image capturing apparatus 2 via a serial bus 109. A SATA I/F 106 is connected via a serial bus 111 to the HDD 112 and a general-purpose drive 113 that reads and writes various recording media. The NIC 107 inputs and outputs information from/to an external apparatus. The CPU 101 uses HDD 112 and/or various storage media mounted on the general-purpose drive 113 as a storage location for various data. The CPU 101 displays a UI (user interface) provided by a program on the display 114, and receives an input such as a user instruction input via the input device 110.

<Functional Configuration of Image Processing Apparatus 1>

Figure 2A:
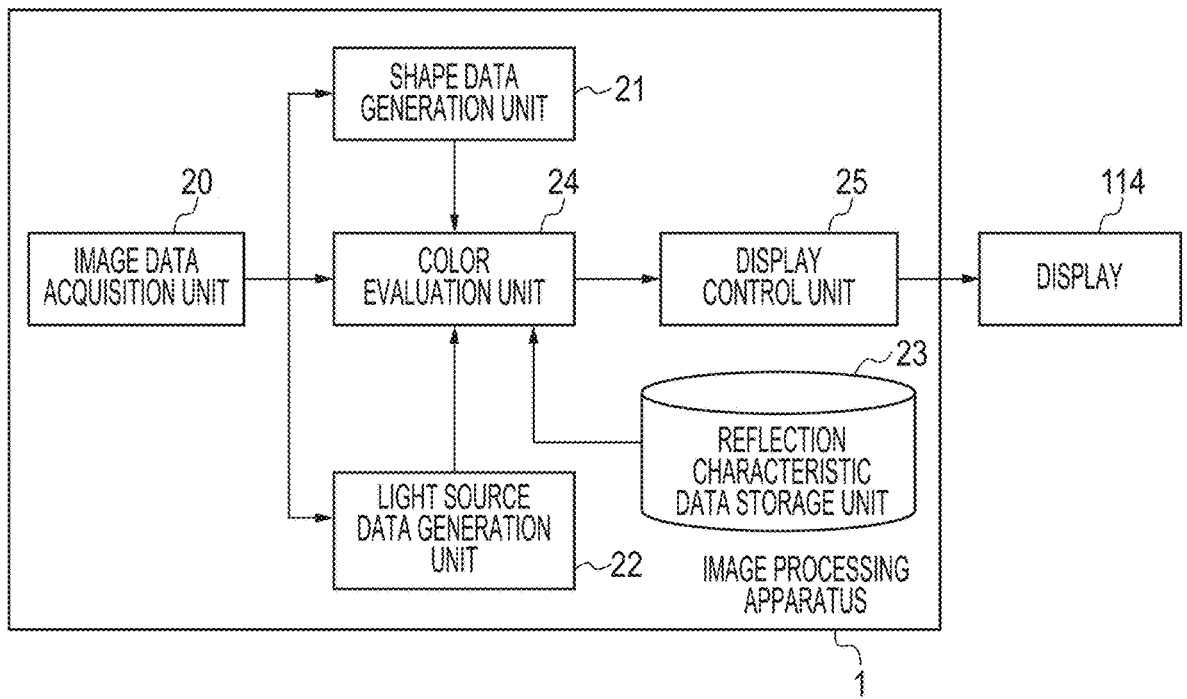
FIG. 2A is a diagram illustrating a functional configuration of an image processing apparatus.

FIG. 2A is a diagram illustrating a functional configuration of the image processing apparatus 1 according to the present embodiment. The image processing apparatus 1 includes an image data acquisition unit 20, a shape data generation unit 21, a light source data generation unit 22, a reflection characteristic data storage unit 23, a color evaluation unit 24, and a display control unit 25.

Figure 6:
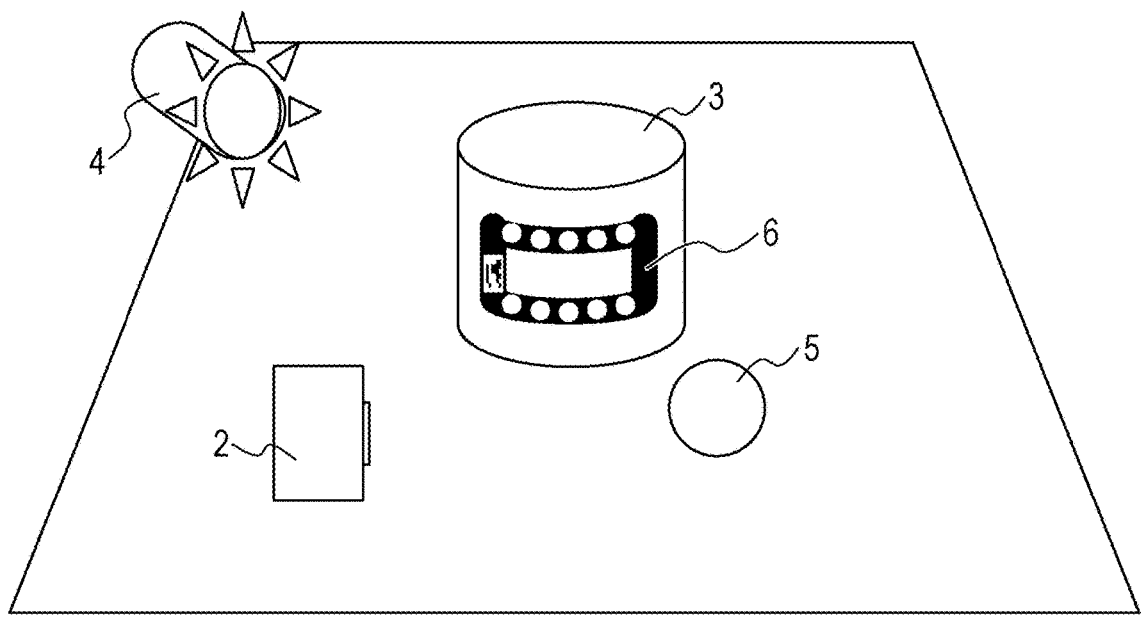
FIG. 6 is a diagram illustrating a manner of capturing an image of an object.

The image data acquisition unit 20 acquires captured image data obtained by capturing an image of the object 3 illuminated by the light source 4. The image data acquisition unit 20 acquires, from the HDD 112, captured image data stored in advance in the HDD 112. Referring to FIG. 6, a manner of capturing an image for acquiring captured image data is described below. The sphere 5 in FIG. 6 is a sphere having a mirror surface, which is disposed to generate light source data. The light source data is data representing a direction in which light travels from the light source 4 to the object 3. The marker 6 is a marker attached to the object 3 for use in generating shape data. The shape data is data representing a shape of a surface of the object 3. Image capturing is performed such that the object 3, the sphere 5, and the marker 6 are included in an imaging range. The shape data generation unit 21 generates shape data representing a three-dimensional shape of the object 3 based on the captured image data acquired by the image data acquisition unit 20. The light source data generation unit 22 generates light source data indicating a direction in which light emitted by the light source 4 travels to the object 3 based on the captured image data acquired by the image data acquisition unit 20. The reflection characteristic data storage unit 23 stores reflection characteristic data representing a reflection characteristic of an object to be referred to, for comparison, in evaluating a color of the object 3. In the present embodiment, the object to be referred to for comparison is a reference plate. The color evaluation unit 24 evaluates a color of a surface of the object 3 based on the captured image data, the shape data, the light source data, and the reflection characteristic data. The display control unit 25 performs control such that the display 114 displays the color evaluation result given by the color evaluation unit 24.

<Process Executed by Image Processing Apparatus 1>

Figure 3A:
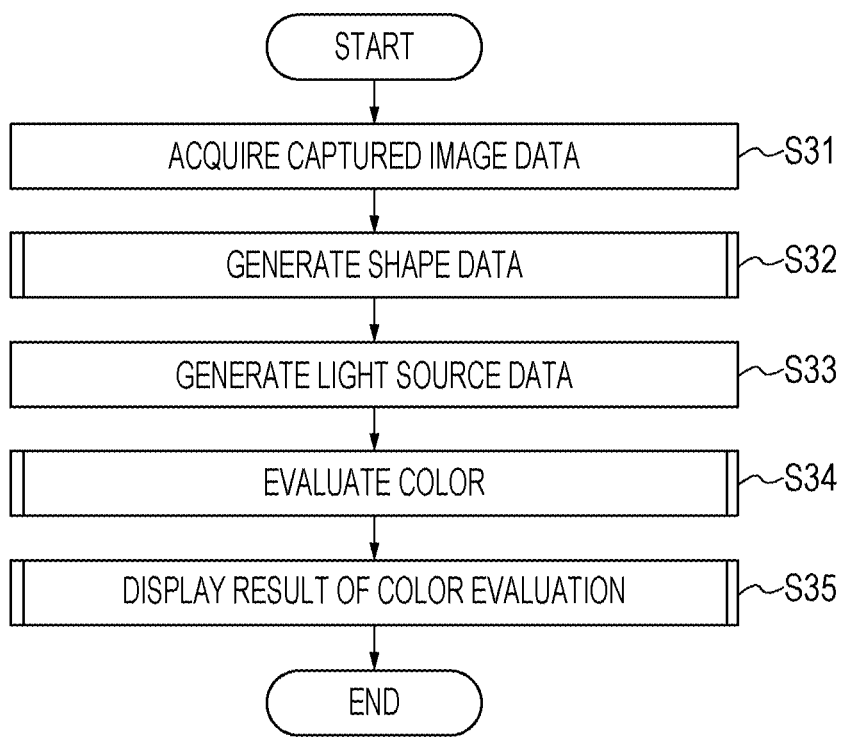
FIG. 3A is a flowchart illustrating a process executed by an image processing apparatus.

FIG. 3A is a flowchart illustrating a process executed by the image processing apparatus 1. Hereinafter, each step (process) is denoted by a step number with a prefix of S.

In S31, the image data acquisition unit 20 acquires captured image data obtained as a result of an image capturing operation performed by the image capturing apparatus 2. In S32, the shape data generation unit 21 generates shape data representing a three-dimensional shape of the object 3 based on the captured image data. Details of the process in S32 will be described later.

Figure 7A:
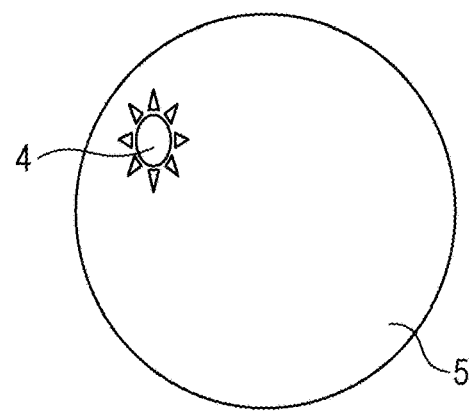
FIG. 7A is a diagram for explaining a process of generating light source data.
Figure 7B:
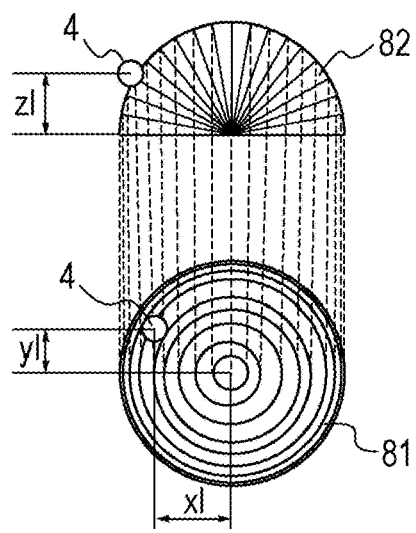
FIG. 7B is a diagram for explaining a process of generating light source data.
Figure 7C:
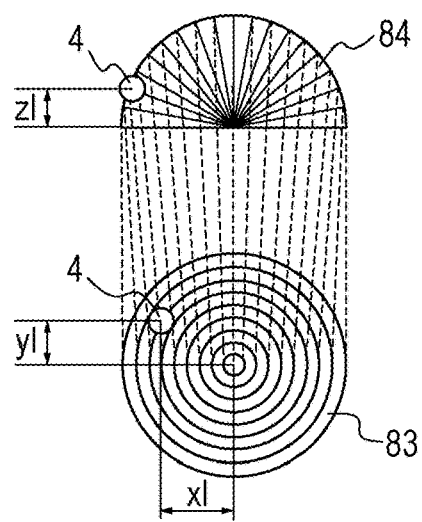
FIG. 7C is a diagram for explaining a process of generating light source data.

In S33, the light source data generation unit 22 generates light source data indicating a direction of light traveling to the object 3 from the light source 4. The process of generating the light source data is described below with reference to FIG. 7. FIG. 7A illustrates is an example of the light source 4 reflected on the mirror-shaped sphere 5 in a captured image. FIG. 7B is a diagram for explaining the process of calculating a light source vector that represents the direction of light from the light source 4 to the object 3. A circle 81 is the mirror-shaped sphere 5 in the captured image, and the circle 81 indicates an azimuth direction in which the light source is located with respect to the surface of the object 3. A semicircle 82 indicates an elevation angle of a direction, with respect to the surface of the object 3, in which the light source exists. In S33, first, the light source data generation unit 22 calculates a pixel position at the center of an area corresponding to the sphere 5 in the captured image. More specifically, pixel values of the captured image are binarized. This binarization process is performed such that pixels having pixel values equal to or larger than a predetermined threshold value are set to a white level, while pixels having pixel values smaller than the predetermined threshold value are set to a black level. After the binarization, edge positions are extracted from the captured image using a known Canny method, and contours are extracted by performing grouping such that eight neighboring pixels including edge positions are regarded as the same contour, and grouped together. Circular or elliptical contours are selected from the plurality of extracted contour groups. In a case where only one contour of a circle or an ellipse is obtained, this one contour is regarded as an area corresponding to the sphere 5, and the center of gravity of three points located on the edge and separated by a distance equal to or greater than a predetermined value is employed as the pixel position of the center of the area corresponding to the sphere 5. The center of gravity may be calculated using at least three points on the edge. The greater number of points are used, the more precisely the pixel position of the center of the area corresponding to the sphere 5 can be calculated. In a case where a plurality of circular or elliptical contours are extracted, a contour having a highest average brightness in an area surrounded by the contour is employed as an area corresponding to the sphere 5. Next, the pixel position of the center of the light source 4 reflected on the sphere 5 is calculated. Here, a pixel having the highest brightness among pixels in the area corresponding to the sphere 5 in the captured image is regarded as the pixel position of the center of the light source 4. Next, the light source data generation unit 22 calculates xl and yl shown in FIG. 7B, where xl and yl are respectively the numbers of pixels existing in the x direction and the y direction from the pixel position at the center of the area corresponding to the sphere 5 to the pixel position at the center of the light source 4. Next, zl is calculated using formula (1).

[Math. 1]

$$zl = \sin \theta$$

$$\theta = \cos^{-1}\sqrt{xl^2 + yl^2}/r \quad (1)$$

In formula (1), r is a radius of the sphere 5 in the captured image. The radius r is given by the number of pixels from the pixel position at the center of the area corresponding to the sphere 5 to an edge position of the area corresponding to the sphere 5. After xl, yl, and zl are calculated, light source data is generated such that a light source vector (xl, yl, zl) is recorded in each pixel.

In S34, the color evaluation unit 24 evaluates a color of a surface of the object 3 based on the captured image data, the shape data, the light source data, and the reflection characteristic data. Details of the process in S34 are described later. In S35, the display control unit 25 performs control such that the display 114 displays the color evaluation result given by the color evaluation unit 24. Details of the process in S35 are described later.

<Process in S32>

Figure 4A:
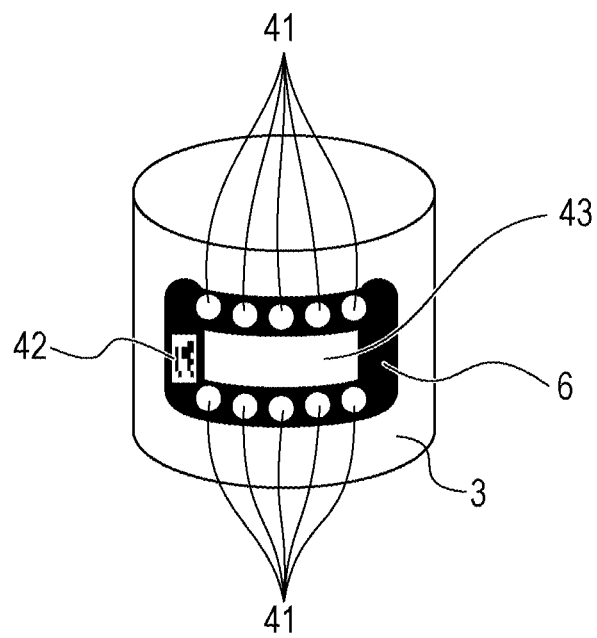
FIG. 4A is a diagram for explaining a method of calculating a shape of an object using a marker.

A method of calculating a three-dimensional shape of the object 3 using a marker 6 is described below. FIG. 4A is a diagram for explaining the method of calculating the three-dimensional shape of the object 3. In FIG. 4A, the marker 6 is attached to the object 3. The marker 6 has mark areas 41, an ID code area 42, and an evaluation area 43. Each of the mark areas 41 is a white circular area, and at least three or more mark areas 41 are formed on the marker 6. The marker 6 has an area including a pattern formed by a plurality of mark areas 41 arranged at predetermined intervals. In FIG. 4A, five mark areas 41 are arranged in the horizontal direction and two mark areas 41 are arranged in the vertical direction, and thus a total of ten mark areas 41 are formed. The evaluation area 43 is an area formed by being cut out in the marker 6. When the marker 6 is attached to the object 3, the surface of the object 3 is exposed via the evaluation area 43, and the color of the surface of the object 3 can be evaluated. The ID code area 42 is an area in which an identification information is represented in the form of a code. The identification information is information for identifying the marker 6. More specifically, a specific number is assigned to each produced marker 6. This identification number makes it possible to, even when a plurality of markers 6 are included in one captured image, evaluate distinguishably colors in the respective evaluation areas 43. The pattern in the ID code area 42 is formed such that the area is divided into 8×8 pixel blocks, that is, a total of 64 blocks each of which is represented by a binary value indicating a white or black level thereby representing 64-bit identification number. The background color of the marker 6 is preferably black because black provides high contrast against the mark areas 41 thereby making it possible to extract the mark areas 41 from the captured image with high accuracy. In the present embodiment, in S32, the three-dimensional shape of the object 3 is calculated using the captured image data obtained by capturing the image of the object 3 with the marker 6 attached thereto.

Figure 8A:
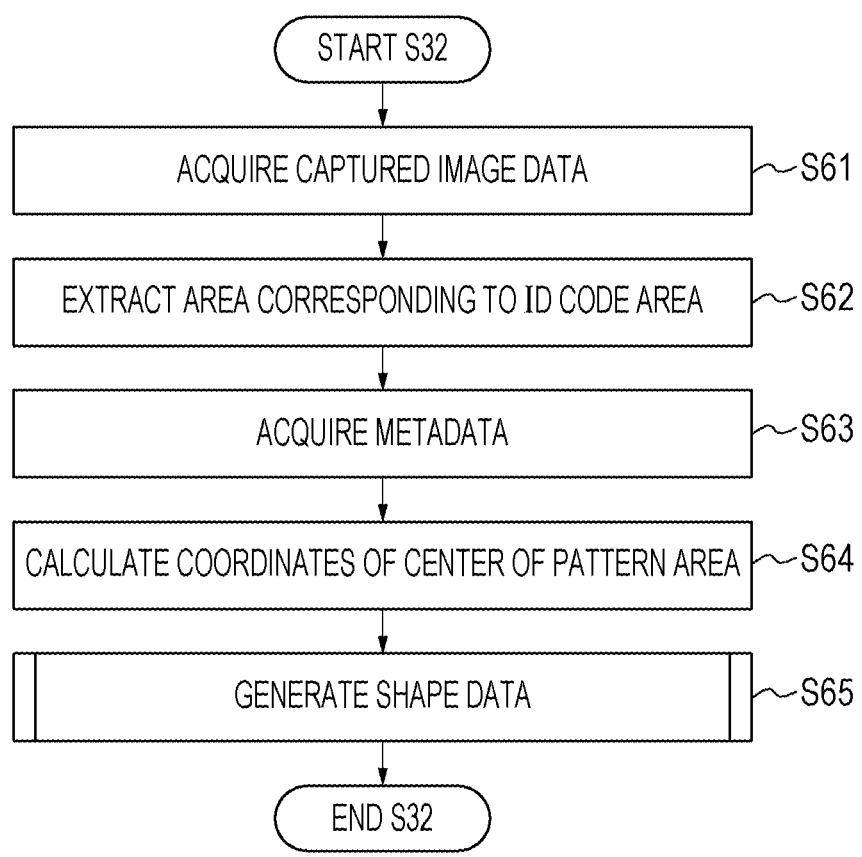
FIG. 8A is a flowchart illustrating a process of generating shape data.

FIG. 8A is a flowchart showing the process in S32. Details of the process in S32 are described below with reference to FIG. 8A.

In S61, the shape data generation unit 21 reads the captured image data acquired by the image data acquisition unit 20. In S62, the shape data generation unit 21 extracts an area corresponding to the ID code area 42 from the captured image represented by the read captured image data, and reads an identification number of the marker 6 from the extracted area. More specifically, pixel values of the captured image are binarized. This binarization process is performed such that pixels having pixel values equal to or larger than a predetermined threshold value are set to a white level, while pixels having pixel values smaller than the predetermined threshold value are set to a black level. After the binarization, edge positions are extracted from the captured image using a known Canny method, and contours are extracted by performing grouping such that eight neighboring pixels including edge positions are regarded as the same contour, and grouped together. A rectangular contour is selected from the extracted plurality of contour groups, and the contour is modified such that the ID code area 42 has the same shape as the actual shape. The pattern inside the modified contour is divided into blocks of 8×8 pixels, and the identification number is read based on the black/white levels of the respective blocks.

Figure 5:
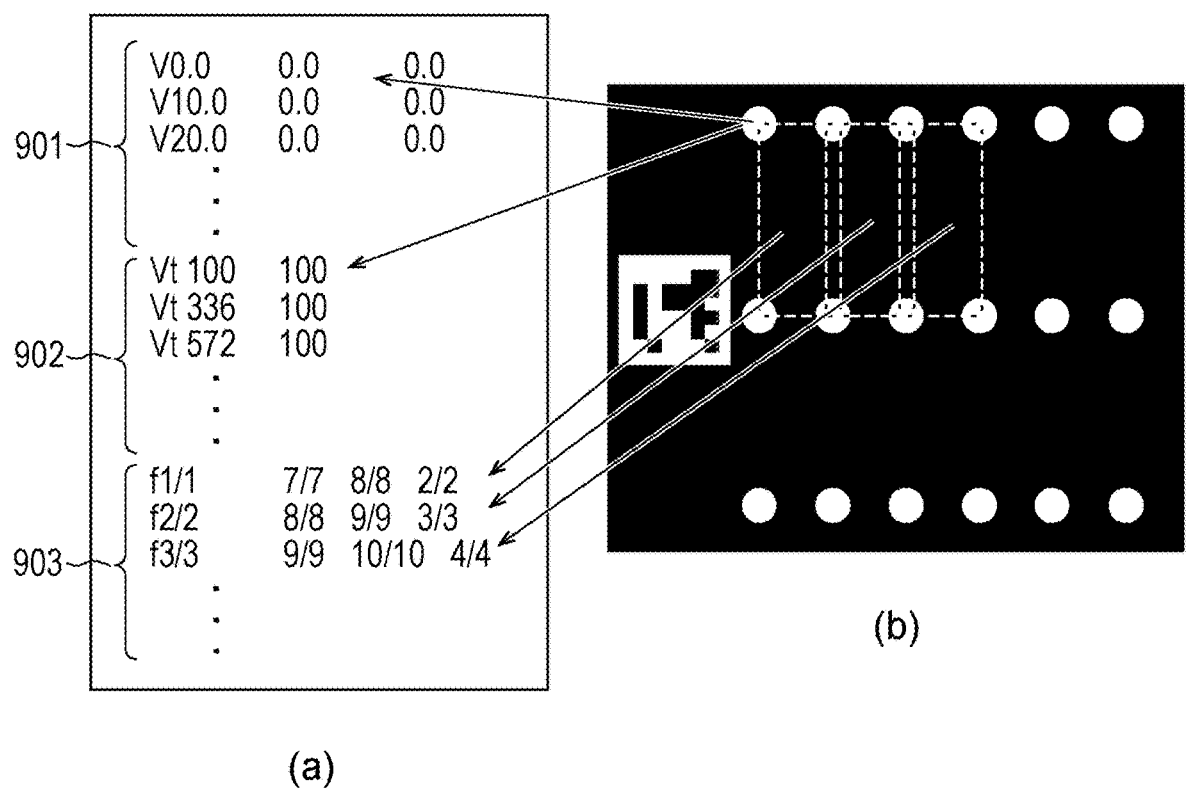
FIG. 5 is a diagram illustrating an example of metadata.

In S63, the shape data generation unit 21 reads metadata having information on the marker 6 corresponding to the identification number. FIG. 5 is a diagram illustrating an example of metadata. FIG. 5(a) is a diagram showing a content recorded in the metadata. A region 901 is a region in which three-dimensional coordinate values (X, Y, Z), on a paper surface, of the center points of the mark regions 41 are described in $N_X \times N_Y$ rows. As those coordinate values, relative positions with respect to an origin taken at the center point of a mark area 41 at an upper left location are described. The area 902 is an area in which two-dimensional coordinate values (u, v) of center points of respective mark areas 41 in the marker image are described. As those coordinate values, relative two-dimensional coordinate values of respective pixels of the marker image with respect to the origin taken at the center point of the mark area 41 at the upper left location are described in $N_X \times N_Y$ rows. An area 903 is an area in which polygon information is described. In the present embodiment, as shown in FIG. 5(b), each polygon is a rectangle whose vertices are located at center points of respective four mark areas 41, and the polygon information is information about vertices forming the rectangle. More specifically, the polygon information represents, in each row, row numbers in the area 901 and row numbers in the area 902 corresponding to four vertices in the order of going counterclockwise around the outer circumference of the rectangle.

In S64, the shape data generation unit 21 calculates the center coordinates of each mark area 41 based on the captured image data. Here, a contour extraction process is performed in a similar manner as in S62, and candidates for contours of circles or ellipses are detected from extracted contours. Areas surrounded by the respective contours of circles or ellipses detected as candidates are calculated, and the candidates are ranked according to the difference between the calculated area surrounded by each contour and the preset area of the mark area 41. A plurality of contours of mark areas 41 of ranks 1 to 10 are extracted, and the center coordinate values of each contour are calculated. Furthermore, the center coordinate values of the contours are sorted such that the relative positional relationship among the center coordinate values of the respective contours corresponds to the relative positional relationship among the coordinate values described in the area 902. Thus, it is possible to easily obtain the center coordinate values of the mark areas 41 corresponding to the rectangles defined in the region 903.

Figure 8B:
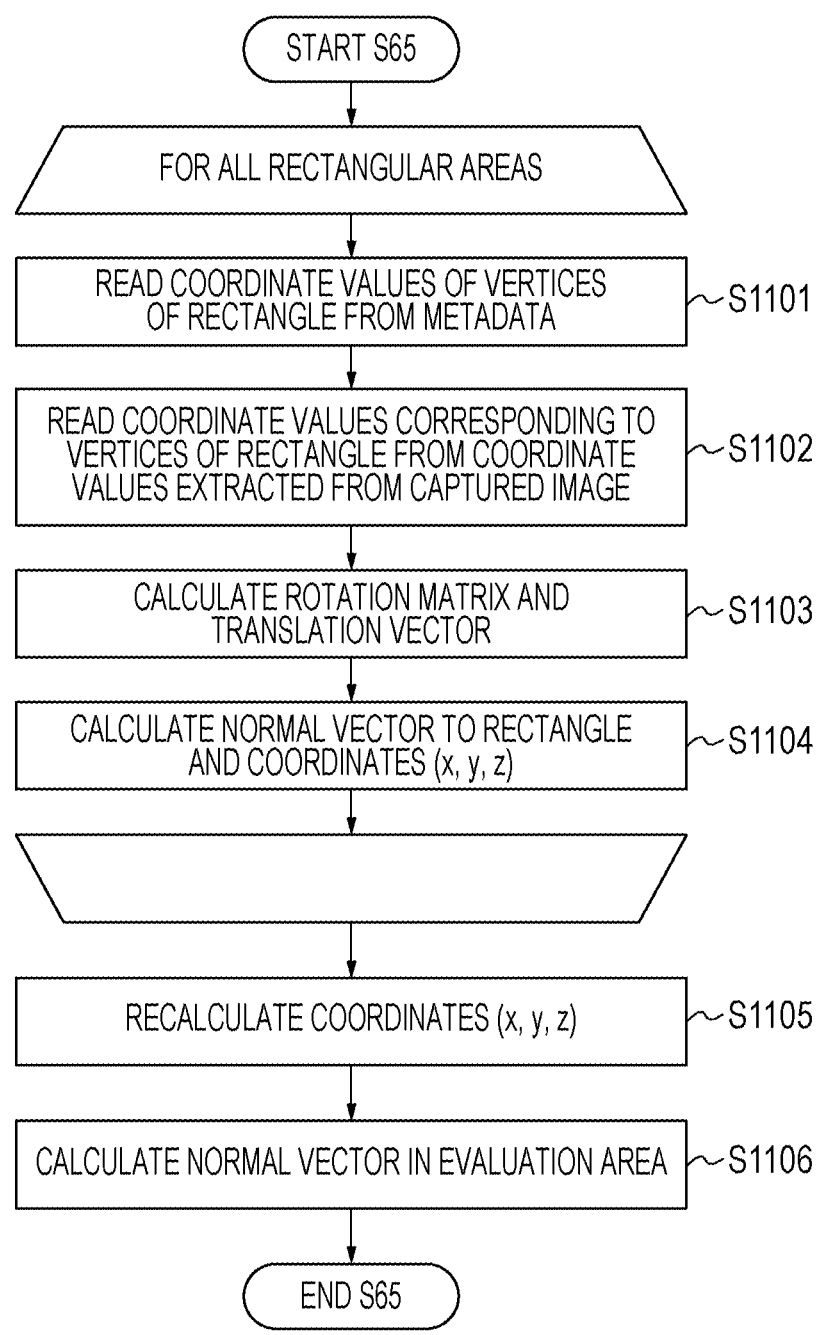
FIG. 8B is a flowchart illustrating a process of generating shape data.

In S65, the shape data generation unit 21 calculates a normal vector on the surface of the object 3 based on the center coordinates of each mark area 41, and generates shape data representing the calculated normal vector. The process in S65 are described in detail below. FIG. 8B is a flowchart showing the process in S65.

In S1101, the shape data generation unit 21 reads three-dimensional coordinate values (X, Y, Z) of vertices of a rectangle from metadata. More specifically, from the metadata, one row of polygon information in the area 903 is read, and coordinate values corresponding to respective vertices of the rectangle indicated by the polygon information are read from the area 901.

In S1102, the shape data generation unit 21 reads coordinate values corresponding to vertices whose coordinate values were read in S1101 from the center coordinates of the mark areas 41 calculated in S64. The order of center coordinate values of mark areas 41 has been sorted in S64 so as to be coincident with the order of center coordinate values described in the area 902. Therefore, in S1102, the central coordinates corresponding to the vertex numbers described in the area 903 may be extracted as in S1101.

In S1103, the shape data generation unit 21 estimates a rotation matrix R including elements given by coefficients $r_{11}$ to $r_{33}$ shown in formula (2) and a translation vector t including elements given by coefficients $t_1$ to $t_3$. By this process, the position and the attitude of the image capturing apparatus 2 with respect to the rectangular plane can be calculated.

[Math. 2]

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} [R \mid t] \begin{bmatrix} X \\ Y \\ Z \\ 1 \end{bmatrix} \qquad (2)$$

$$R = \begin{bmatrix} r_{11} & r_{12} & r_{13} \\ r_{21} & r_{22} & r_{23} \\ r_{31} & r_{32} & r_{33} \end{bmatrix}$$

$$t = \begin{bmatrix} t_1 \\ t_2 \\ t_3 \end{bmatrix}$$

In formula (2), $f_x$ and $f_y$ are focal lengths of the image capturing apparatus 2 in an x direction and a y direction in a three-dimensional space whose origin is at the position of the image capturing apparatus 2, and $c_x$ and $c_z$ are principal point positions of the image capturing apparatus 2 in the x direction and a z direction. Values of $f_x$, $f_y$, $c_x$, and $c_z$ are determined in advance and stored in the HDD 112. In formula (2), coordinates (u, v) are center coordinates of the mark areas 41 in the captured image read in S1102. Coordinates (X, Y, Z) in formula (2) are three-dimensional coordinate values corresponding to the coordinates (u, v) described in the metadata read in S1101, and s is a scaling factor given by a value equal to the reciprocal of a third-row element of a three-dimensional vector obtained as a result of the calculation of the right side of equation (2) such that the third-row element of the resultant three-dimensional vector becomes equal to 1. In S1103, the shape data generation unit 21 estimates the rotation matrix and the translation vector based on the correspondence between the coordinates (u, v) of the four vertices of the rectangle and the coordinates (X, Y, Z). That is, in this estimation method, the rotation matrix and the translation vector are estimated using coordinates (u, v) of three or more points and coordinates (X, Y, Z) corresponding to the coordinates (u, v).

In S1104, the shape data generation unit 21 calculates three-dimensional coordinates (x, y, z) of each vertex of the rectangle with respect to the origin taken at the position of the image capturing apparatus 2, and a normal vector to a plane including each vertex. First, according to formula (3), the three-dimensional coordinates (x, y, z) of each vertex are calculated.

[Math. 3]

$$\begin{bmatrix} x \\ y \\ z \end{bmatrix} = R \begin{bmatrix} X \\ Y \\ Z \end{bmatrix} + t \qquad (3)$$

In formula (3), R is the rotation matrix calculated in S1103, and t is the translation vector calculated in S1103. The coordinates (X, Y, Z) are three-dimensional coordinate values of each vertex read, in S1101, from the metadata read. Next, the shape data generation unit 21 calculates vectors such that an origin is taken at coordinates (x, y, z) of one vertex of the rectangle, and vectors of coordinates (x, y, z) of two other vertices are calculated. A unit vector in a direction indicated by a cross product vector of the calculated two vectors is employed as a normal vector to the rectangular surface. In a case where Z values of the coordinates (X, Y, Z) of the vertices are the same, a unit vector given by a vector including as elements r13, r23, and r33 in the third column of the rotation matrix R may be used as the normal vector.

The shape data generation unit 21 performs the above-described process in S1101 to S1104 on all rectangular areas, and the three-dimensional coordinates (x, y, z) of the vertices of each rectangle with respect to the origin taken at the position of the image capturing apparatus 2 are acquired. Even in a case where the object 3 has a curved surface, if the rectangles are arranged at intervals such that the rectangles can be regard as lying in a plane, the obtained coordinates can be regarded as three-dimensional coordinate values on the object 3.

In S1105, the shape data generation unit 21 determines the three-dimensional coordinates (x, y, z) of the centers of the mark areas 41. The vertices of each rectangle calculated in the process in S1101 to S1104 have overlapping as shown in FIG. 5(b). Therefore, in S1105, the shape data generation unit 21 recalculates the coordinates (x, y, z) of the overlapping vertices. More specifically, first, in each rectangle, a plane is calculated which includes vertices overlapping with an adjacent rectangle and which has a normal vector of the rectangle as a normal of the plane. Next, a straight line passing through the origin and the coordinates of a non-overlapping vertex is calculated, and the intersection of the straight line and the plane is employed as new non-overlapping vertex coordinates. By recalculating the coordinate values in the manner described above, the normal vector of each rectangle can be maintained. The average values of the coordinates (x, y, z) of the overlapping vertices may be employed as the three-dimensional coordinate values of the center of the corresponding mark area 41.

In S1106, the shape data generation unit 21 generates shape data such that the normal vector calculated for each rectangle is described in each pixel. Here, assuming that the normal vector is the same in the rectangle, the normal vector (xn, yn, zn) is described in each pixel. In the present embodiment, the color evaluation is performed for the evaluation area 43, and thus the normal vector represented by the shape data may be described only in pixels corresponding to the evaluation area 43.

<Process in S34>

FIG. 9 is a flowchart showing the process in S34. The flow of the process in S34 is described below with reference to FIG. 9.

In S241, the color evaluation unit 24 converts the color information (RGB values) described in each pixel of the captured image into XYZ values. The conversion from the RGB values to the XYZ values is performed using a known method. In S242, the color evaluation unit 24 acquires the shape data generated by the shape data generation unit 21. In S243, the color evaluation unit 24 acquires the light source data generated by the light source data generation unit 22.

In S244, the color evaluation unit 24 acquires the reflection characteristic data from the reflection characteristic data storage unit 23. The reflection characteristic data stored in the reflection characteristic data storage unit 23 is described below. FIGS. 10A and 10B are diagrams for explaining a method of generating reflection characteristic data. In FIG. 10A, a reference plate 91 is a flat plate that is referred to, for comparison, in evaluating the color of the object 3. The reflection characteristic data is given in the form of a look-up table representing the correspondence between the image capturing condition and the color information of the reference plate 91, which is obtained by imaging the reference plate 91. An image capturing method is described below with reference to FIG. 10B. As shown in FIG. 10B, the position of the light source 4 is fixed, and the position of the image capturing apparatus 2 is moved in steps of 10° of azimuth angle in a range from 0° to 350° with respect to the reference plate 91. Each time the azimuth angle is changed by 10°, the imaging operation is per formed. This image capturing operation is performed at various elevation angles with respect to the reference plate 91 in steps of 10° from 0° to 90°. Next, the above-described image capturing operation performed while moving the image capturing apparatus 2 is performed, while moving the light source 4, at various azimuth angles of the light source 4 with respect to the reference plate 91 in steps of 10° from 0° to 350°. Furthermore, the image capturing operation is performed at various elevation angles of the light source 4 with respect to the reference plate 91 such that image capturing is performed each time the elevation angle of the light source 4 is changed by 10° in a range from 0° to 90°. When the position of the image capturing apparatus 2 and the position of the light source 4 overlap, the imaging operation is not performed. When the elevation angle is 90°, the azimuth angle cannot be changed, and thus the movement by changing the azimuth direction is not performed. Color information of the reference plate 91 in each image capturing condition is defined such that, assuming that the reference plate 91 has the same color over the entire area, color information (RGB values) recorded in arbitrary pixel of the captured image obtained via the image capturing operation is employed as the color information. FIG. 10C shows reflection characteristic data representing color information (RGB values) under the respective image capturing conditions. Each image capturing condition is determined by the azimuth angle and the elevation angle of the position of the light source 4 and the azimuth angle and the elevation angle of the position of the image capturing apparatus 2. The moving of the image capturing apparatus 2 and the moving of the light source 4 do not necessarily need to be performed in steps of 10°, but may be performed in steps of, for example, 1°. The reflection intensity varies greatly in the vicinity of the specular reflection direction of the light from the light source 4 to the reference plate 91, and thus the movement may be made in steps of 1° in the vicinity of the specular reflection direction, and the steps of angle of movement may be increased as the direction goes away from the specular reflection direction.

Figure 11A:
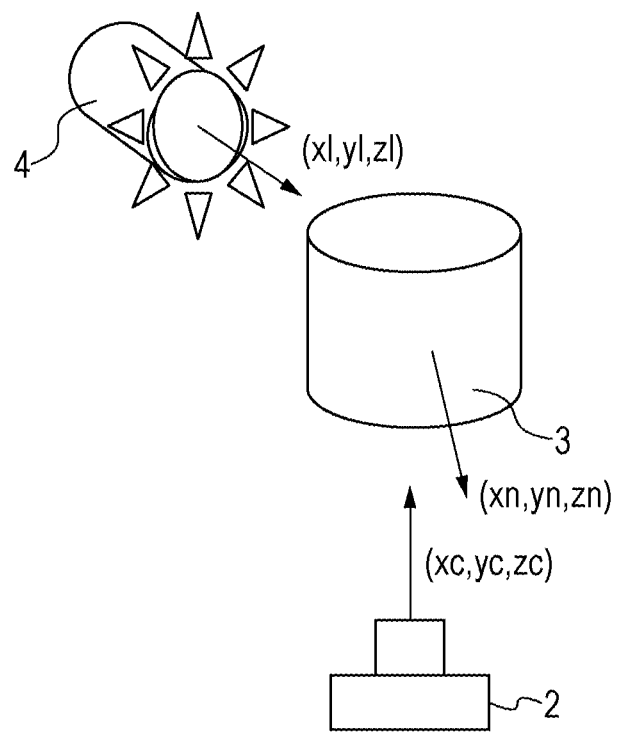
FIG. 11A is a diagram for explaining a process of acquiring color information from reflection characteristic data.
Figure 11B:
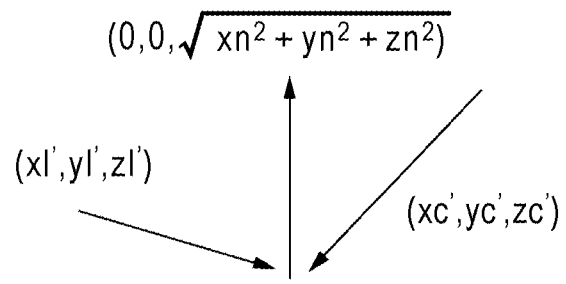
FIG. 11B is a diagram for explaining a process of acquiring color information from reflection characteristic data.

In S245, the color evaluation unit 24 acquires, from the reflection characteristic data, the color information of the reference plate for comparison with the color information of the area corresponding to the evaluation area 43 of the captured image. First, as shown in FIG. 11A, the normal vector (xn, yn, zn) of a pixel in an area corresponding to the evaluation area 43 in the captured image, the light source vector (xl, yl, zl), and a vector (xc, yc, zc) representing the direction from the image capturing apparatus 2 to the object 3 are acquired. Hereinafter, the vector representing the direction from the image capturing apparatus 2 to the object 3 is referred to as an image capture direction vector. The normal vector (xn, yn, zn) is acquired from the shape data, and the light source vector (xl, yl, zl) is acquired from the light source data. The image capturing apparatus 2 is located directly opposed to the surface to be captured, and thus the image capture direction vector is given as (0, 0, −1). Next, as shown in FIG. 11B, a rotation matrix that rotates the normal vector so as to point directly upwards is calculated, and the light source vector and the image capture direction vector are rotated by the resultant rotation matrix. The resultant rotated light source vector is denoted as (xl', yl', zl'), and the resultant rotated image capture direction vector is denoted as (xc', yc', zc'). The reason why the normal vector is rotated into the directly upward direction is that when the image capturing for generating the reflection characteristic data is performed in a state where the normal of the surface of the reference plate points directly upward. Note that the normal vector points directly upwards when the normal vector (xn, yn, zn) is (0, 0, $\sqrt{xn^2+yn^2+zn^2}$). Color information of the reference plate 91 obtained by performing image capturing under an image capturing condition closest to the condition in terms of the light source direction and the image capture direction respectively represented by (xl', yl', zl') and (xc', yc', zc') is acquired from the reflection characteristic data. Note that four pieces of color information of the reference plate captured under close image capturing conditions may be extracted from the reflection characteristic data, and the color information of the reference plate may be calculated using interpolation. Furthermore, the color information (RGB values) of the reference plate is converted into XYZ values by the same method as in S241.

In S246, the color evaluation unit 24 calculates the color evaluation value based on the color information of each pixel in the area corresponding to the evaluation area 43 in the captured image and the color information of the reference plate corresponding to the color information. More specifically, first, according to formulas (4) to (8), the XYZ values are converted into L*a*b* values. The color information of the captured image is denoted as (Xc, Yc, Zc), the color information of the reference plate is denoted as (Xb, Yb, Zb), and the XYZ values of a standard white color are denoted as (Xw, Yw, Zw). As for the XYZ values of the standard white color, predetermined values are used. When (Xc, Yc, Zc) and (Xb, Yb, Zb) are substituted into (X, Y, Z) in formulas (4) to (8), resultant (L*c, a*) c, b*c) and (L*b, a*b, b*b) are determined.

[Math. 4]

$$XRate = (X/Xw)^{1/3},$$
where $X/Xw > 0.00856;$
$$XRate = 7.787 \times (X/Xw) + 16.0/116.0,$$
where $X/Xw \leq 0.00856;$ \quad (4)

$$YRate = (Y/Yw)^{1/3},$$
where $Y/Yw > 0.00856;$
$$YRate = 7.787 \times (Y/Yw) + 16.0/116.0,$$
where $Y/Yw \leq 0.00856;$ \quad (5)

$$ZRate = (Z/Zw)^{1/3},$$
where $Z/Zw > 0.00856;$
$$ZRate = 7.787 \times (Z/Zw) + 16.0/116.0,$$
where $Z/Zw \leq 0.00856;$ \quad (6)

$$L^* = 116.0 \times (Y/Y_w)^{\frac{1}{3}} - 16.0,$$
where $Y/Y_w > 0.00856;$
$$L^* = 903.29 \times (Y/Y_w),$$
where $Y/Y_w \leq 0.00856.$ \quad (7)

[Math. 5]

$$a^* = 500 \times (XRate - YRate)$$
$$b^* = 200 \times (YRate - ZRate)$$ \quad (8)

Using the calculated (L*c, a*c, b*c) and (L*b, a*b, b*b), one of the color difference ΔE, the lightness differences ΔL*, Δa*, Δb*, and the saturation differences ΔC is calculated as the evaluation value. The evaluation value is calculated according to formula (9) shown below. In the present embodiment, it is set in advance that the color difference ΔE is employed as the evaluation value.

[Math. 6]

$$\Delta E = \sqrt{(L^*c - L^*b)^2 + (a^*c - a^*b)^2 + (b^*c - b^*b)^2}$$

$$\Delta L^* = L^*c - L^*b$$

$$\Delta a^* = a^*c - a^*b$$

$$\Delta b^* = b^*c - b^*b$$

$$\Delta C = \sqrt{a^*c^2 + b^*c^2} - \sqrt{a^*b^2 + b^*b^2} \quad (9)$$

Note that a value obtained by combining two or more of the color difference ΔE, the lightness differences ΔL*, Δa*, Δb*, and the saturation difference ΔC may be used as the evaluation value. Alternatively, evaluation value candidates may be displayed on the display 114, and a user may select an evaluation value from the candidates.

<Process in S35>

In S35, the display control unit 25 performs control such that the display 114 displays the color evaluation result given by the color evaluation unit 24. FIG. 12 illustrates an example of a displayed evaluation result. In FIG. 12, a screen 251 is for displaying the result of the evaluation of the evaluation area 43. An evaluation value scale 252 represents a scale of the evaluation value. A maximum value 253 indicates a maximum value of the evaluation value scale. When the evaluation value is equal to or smaller than a predetermined threshold value for all pixels in the evaluation area 43 and thus the evaluation passes (OK), the result is displayed as denoted by 254. In a case the evaluation value is greater than the predetermined threshold value for any one of pixels in the evaluation area 43 and thus the evaluation fails (NG), the result is displayed as denoted by 255. In displaying the evaluation result on the screen 251, when the evaluation value is 0, a color at the bottom of the evaluation value scale 252 is displayed, while when the evaluation value is equal to or greater than the maximum value 253 of the evaluation value scale 252, a color at the top of the evaluation value scale 252 is displayed. In a case where the evaluation value is equal to or greater 0 and equal to or smaller than the maximum value of the evaluation value scale 252, an intermediate color is calculated by linear interpolation and the resultant color is displayed. In a case where the number of pixels having an evaluation value larger than the predetermined threshold value is smaller than a predetermined number of pixels, the inspection may be determined to be passed (OK).

Effects of the First Embodiment

As described above, the image processing apparatus according to the present embodiment acquires the color information of the first object obtained by capturing the image of the first object illuminated by the light source. The color information of the second object is acquired based on the condition under which the image of the first object is captured and which is determined by the direction in which the first object is imaged, the direction in which the light source illuminates the first object with light, and the direction of the normal of the first object. Information according to the color information of the first object and the color information of the second object is output. Thus, it is possible to evaluate the color of the object regardless of the shape of the object or the image capturing condition.

(Modifications)

Figure 4B:
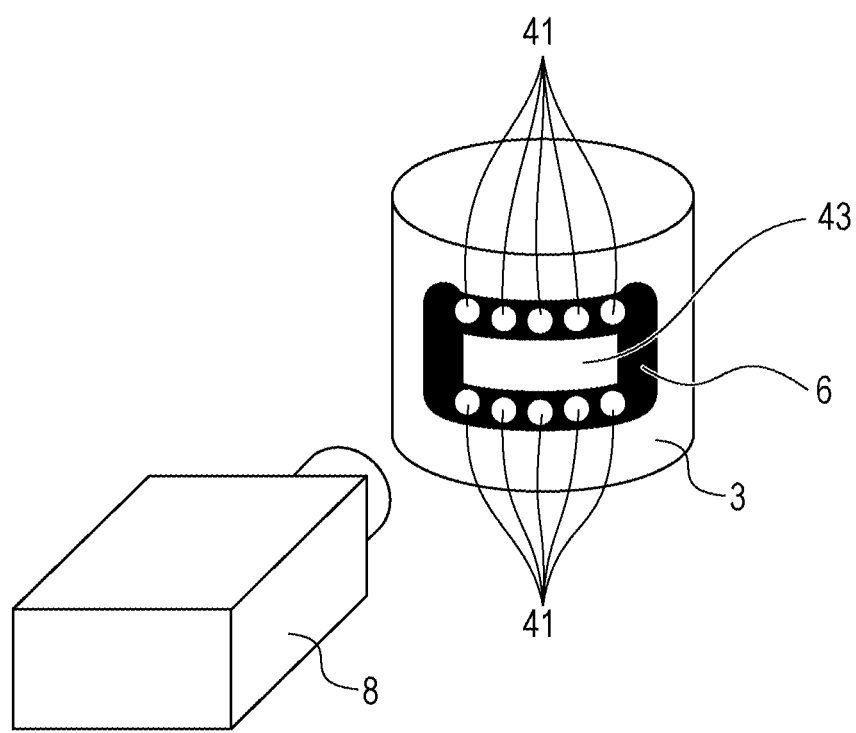
FIG. 4B is a diagram for explaining a method of calculating a shape of an object using a marker.

In the embodiment described above, the marker 6 is directly attached to the object 3. However, a marker image may be projected onto the object 3 using a projection apparatus such as a projector. FIG. 4B illustrates a manner of projecting a marker image onto the object 3 using the projector 8. The process of calculating the shape of the object 3 is similar to S32.

Figures 23A, 23B:
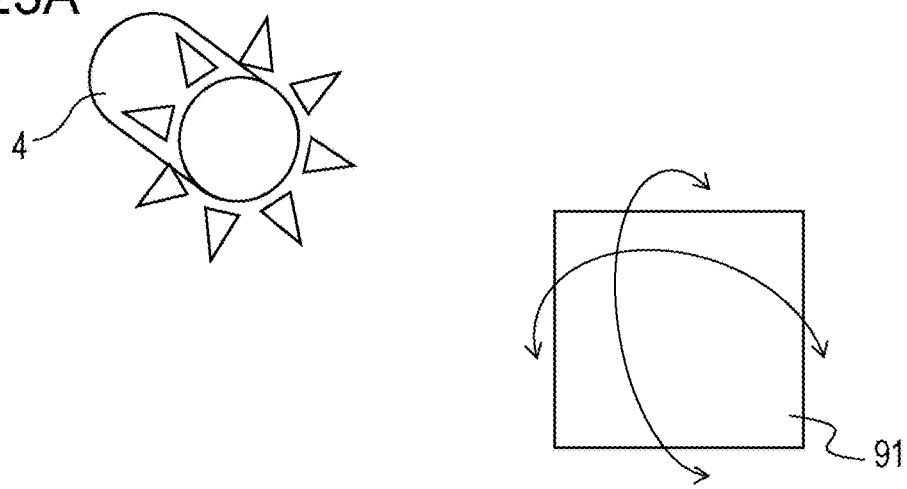
FIG. 23A is a diagram for explaining reflection characteristic data.
FIG. 23B is a diagram for explaining reflection characteristic data.

The reflection characteristic data acquired in S244 in the embodiment is generated by performing the image capture operation while fixing the reference plate 91 and moving the image capturing apparatus 2 and the light source 4 as shown in FIG. 10B. However, the method of generating the reflection characteristic data is not limited to this example. For example, as shown in FIG. 23A, the reflection characteristic data may be generated by performing the image capture operation while fixing the image capturing apparatus 2 and the light source 4 and rotating the reference plate 91. In this case, the image capturing apparatus 2 and the light source 4 are fixed such that the image capturing condition in this state is the same as the image capturing condition in capturing the image of the object 3, and the image capture operation is performed while rotating the reference 91. More specifically, the azimuth angle of the normal direction of the reference plate 91 is fixed, and the elevation angle of the normal direction of the reference plate 91 is changed in steps of 10° from 0° to 180° while an image is captured each time the elevation angle of the normal direction is changed. This image capturing is performed for various azimuth angles of the normal direction of the reference plate 91 in steps of 10° from 0° to 360°. FIG. 23B shows reflection characteristic data representing color information (RGB values) corresponding to each normal direction of the reference plate 91. In the above-described method of generating the reflection characteristic data, the reflection characteristic data can be generated by a smaller number of image capturing operations than the method in which the image capturing is performed while moving the image capturing apparatus 2 and the light source 4. Furthermore, when the color information of the reference plate 91 is acquired from the reflection characteristic data, it is not necessary to use the light source vector and the image capture direction vector, and it is not necessary to perform the process of rotating the normal vector. In the example described above, by way of example, the image capturing apparatus 2 and the light source 4 are fixed. However, only the image capturing apparatus 2 or only the light source 4 may be fixed. Note that any of three of the image capturing apparatus 2, the light source 4, and the reference plate 91 may not be fixed.

Figure 24:
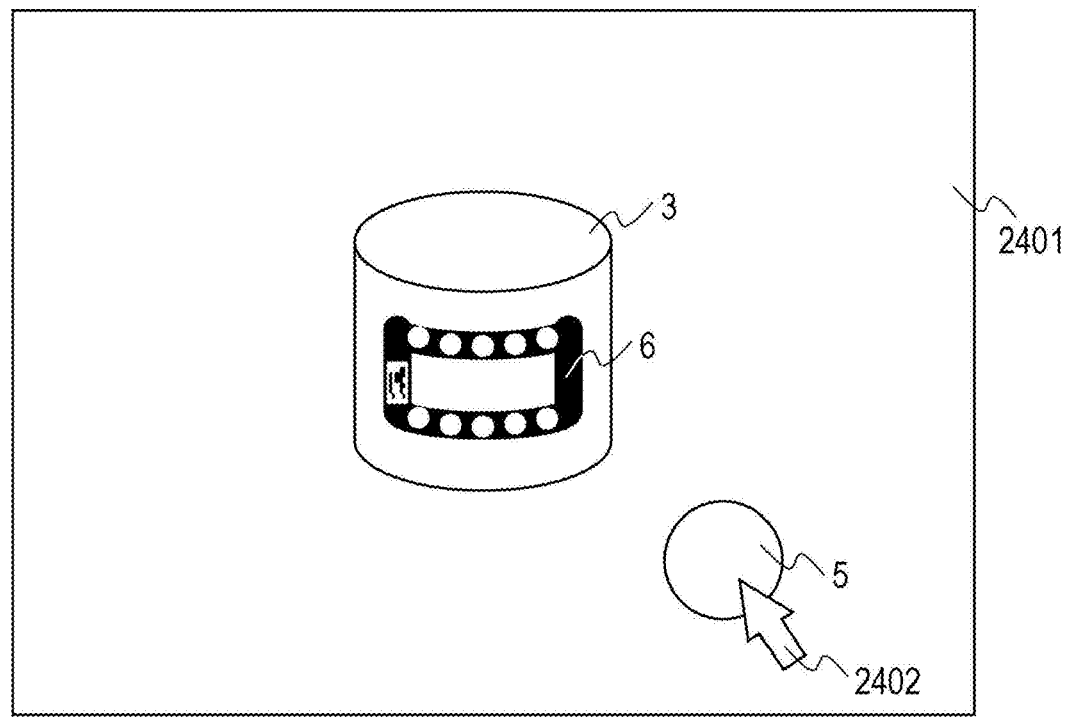
FIG. 24 is a diagram illustrating an example of a UI for use by a user to designate a region corresponding to a sphere.

In the present embodiment, in S33, the light source data generation unit 22 calculates the area corresponding to the sphere 5 in the captured image based on the captured image obtained by performing the image capturing such that the object 3, the sphere 5, and the marker 6 are included in the imaging range. The method of determining the area corresponding to the sphere 5 in the captured image is not limited to the above one example. For example, specifying the area corresponding to the sphere 5 in the captured image may be accepted from a user via a UI. FIG. 24 illustrates an example of a UI for use by a user to specify a region corresponding to the sphere 5 in the captured image. The captured image 2401 is displayed on the display 114, and a cursor 2402 is moved according to an instruction given by the user using the input device 110. Based on the instruction from the user to determine the area, the area indicated by the cursor 2402 is determined as the area corresponding to the sphere 5 in the captured image 2401. This determining method makes it possible to suppress determining an erroneous region as the region corresponding to the sphere 5 in the captured image.

Figure 25:
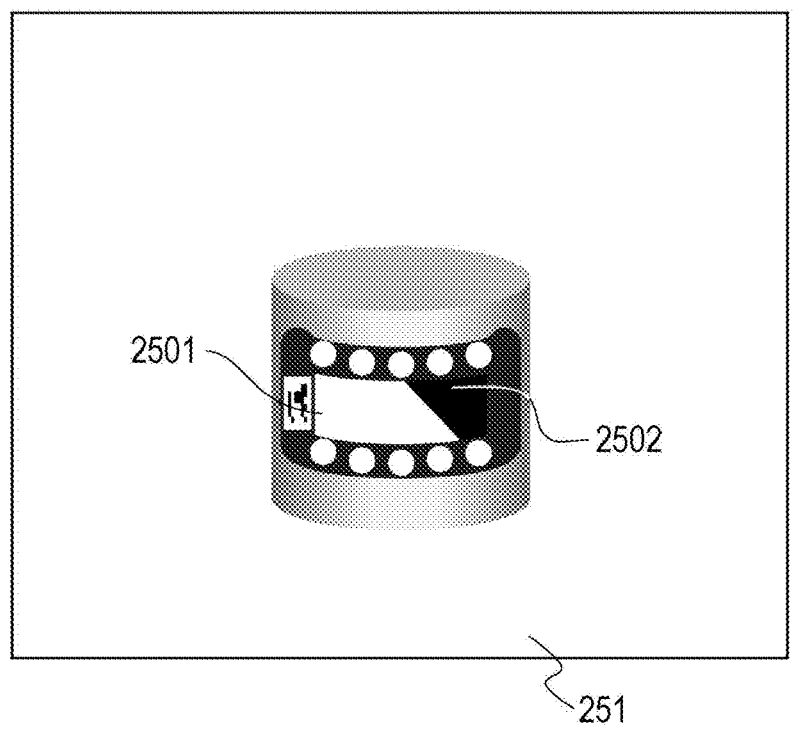
FIG. 25 is a diagram illustrating an example of a displayed evaluation result.

An example of a method of displaying a result of evaluating a color in S35 in the present embodiment is shown in FIG. 12. Alternatively, a displaying method shown in FIG. 25 may be used. The image shown in FIG. 25 is a binary image in which each pixel holds a result of determination as to whether it passes inspection (OK) or fails inspection (NG) for each pixel of the image. Here, a region 2501 displayed in white includes pixels that have passed inspection (OK), while a region 2502 displayed in black includes pixels that have failed inspection (NG). In the evaluation area 43, a pixel having an evaluation value equal to or smaller than a predetermined threshold value is determined to pass the inspection (OK), while a pixel having an evaluation value greater than the predetermined threshold value is determined to fail inspection (NG).

Figure 26:
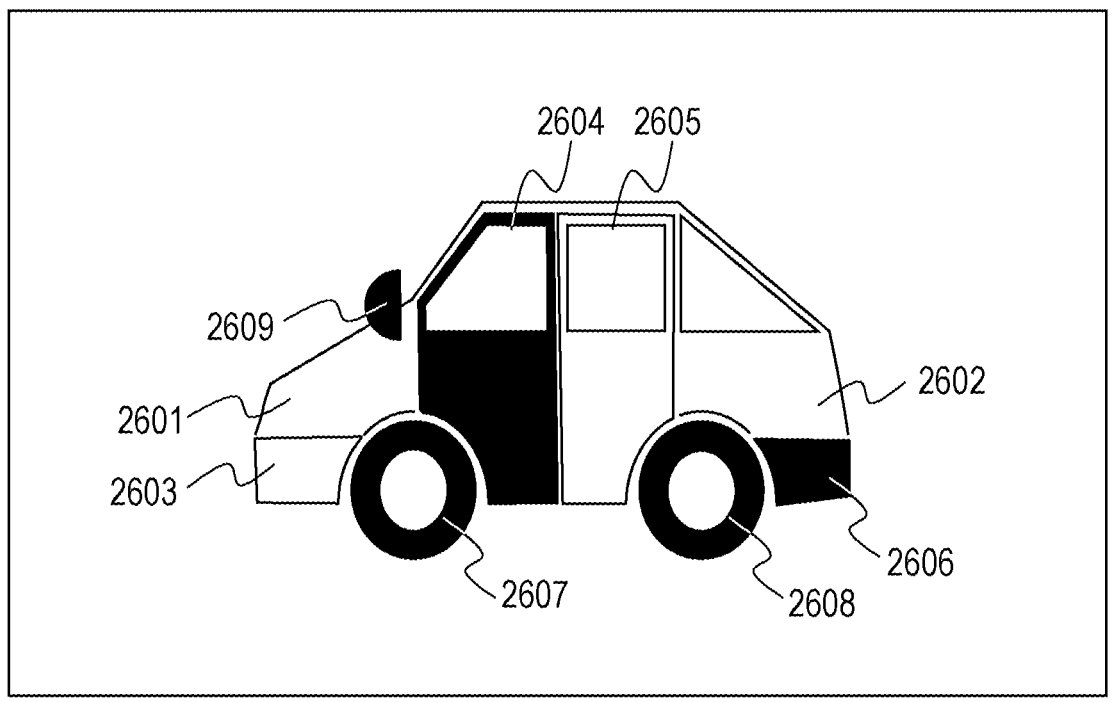
FIG. 26 is a diagram illustrating an example of a displayed evaluation result.

In the present embodiment, it is determined for each evaluation area 43 whether the inspection passes (OK) or the inspection fails (NG). In a case where a color of an industrial product such as a vehicle made up of a plurality of parts is inspected, a determination may be made for each part. FIG. 26 shows an example of a method of displaying a result of an evaluation of a color displayed in S35. In FIG. 26, a vehicle includes a front fender 2601, a rear fender 2602, a front bumper 2603, a front door 2604, a rear door 2605, a rear bumper 2606, a front tire 2607, a rear tire 2608, and a mirror 2609. In this case, the evaluation value is calculated for each part, and it is determined whether the evaluation value is equal to or smaller than a predetermined threshold value. The evaluation value for each part is given by, for example, an average value or a median value of the evaluation values of pixels included in the area corresponding to the part. As shown in FIG. 26, when the inspection is OK for a part, the whole part is displayed in white. However, when the inspection is not passed (NG), the whole part is displayed in black. In the example shown in FIG. 26, the front door 2604, the rear bumper 2606, and the mirror 2609 are determined to have failed the inspection (NG) and are displayed in black, and the other parts are determined to have passed the inspection (OK) and are displayed in white. Furthermore, in the example shown in FIG. 26, the front tire 2607 and the rear tire 2608 are excluded from the inspection targets. The inspection targets may be selected according to a specification given by a user. When an industrial product such as a vehicle includes a part that has failed inspection (NG), the part may have an unevenness in color occurring during painting or the like, information on a painting method or the like for each part may be provided to the user. Although the vehicle has been described as an example of an industrial product, other industrial products such as a camera, a printer, or the like may be treated as long as they are objects formed by combining a plurality of three-dimensional objects.

In the embodiment described above, the color evaluation value is calculated using the color information of the captured image and the color information of the reference plate, and outputting is performed according to the calculated evaluation value. However, the method of outputting the information is not limited to the above one example as long as information can be output according to the color information of the captured image and the color information of the reference plate. For example, the color information of the captured image and the color information of the reference plate may be displayed such that the correspondence between them can be understood.

Second Embodiment

In the first embodiment, the light source data is generated based on the captured image data, but light source data which has been generated in advance may be acquired. In a second embodiment, light source data generated in advance is acquired and used in evaluating a color. The following description will focus on differences between the second embodiment and the first embodiment.

<Functional Configuration of Image Processing Apparatus 1>

Figure 2B:
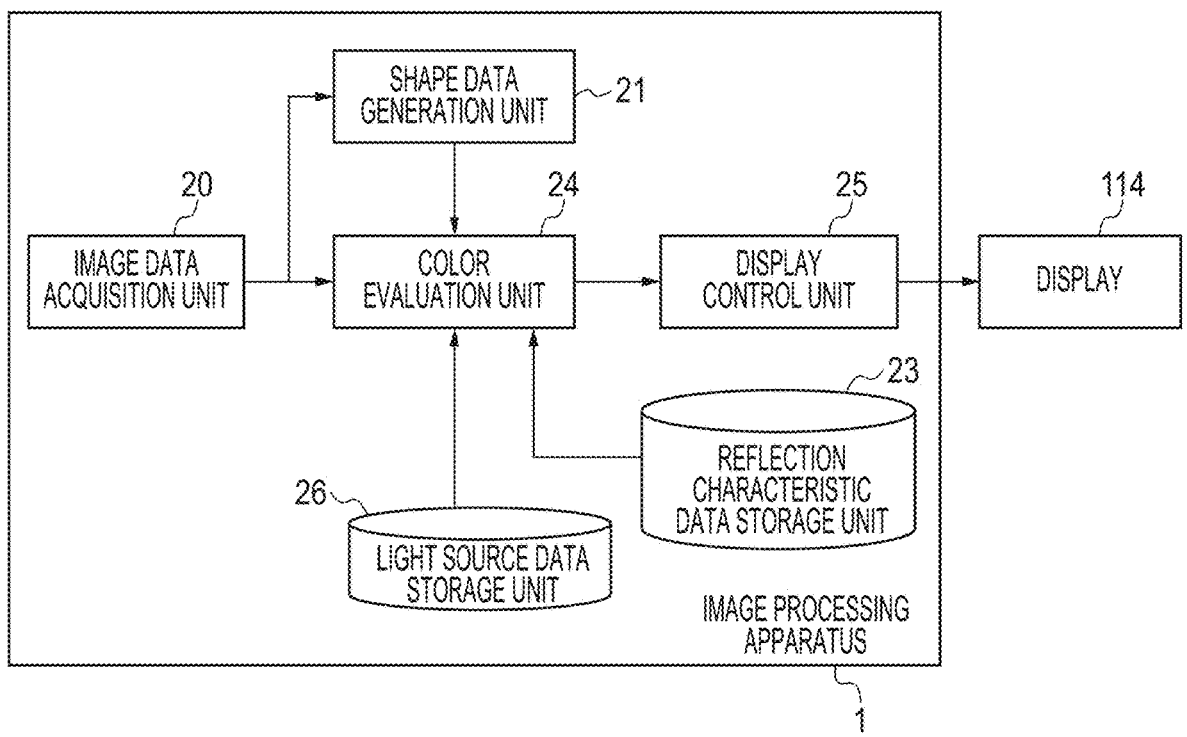
FIG. 2B is a diagram illustrating a functional configuration of an image processing apparatus.

FIG. 2B is a diagram illustrating a functional configuration of the image processing apparatus 1 according to the present embodiment. The image processing apparatus 1 includes an image data acquisition unit 20, a shape data generation unit 21, a reflection characteristic data storage unit 23, a color evaluation unit 24, a display control unit 25, and a light source data storage unit 26. The light source data storage unit 26 stores light source data generated in advance.

<Process Executed by Image Processing Apparatus 1>

Figure 3B:
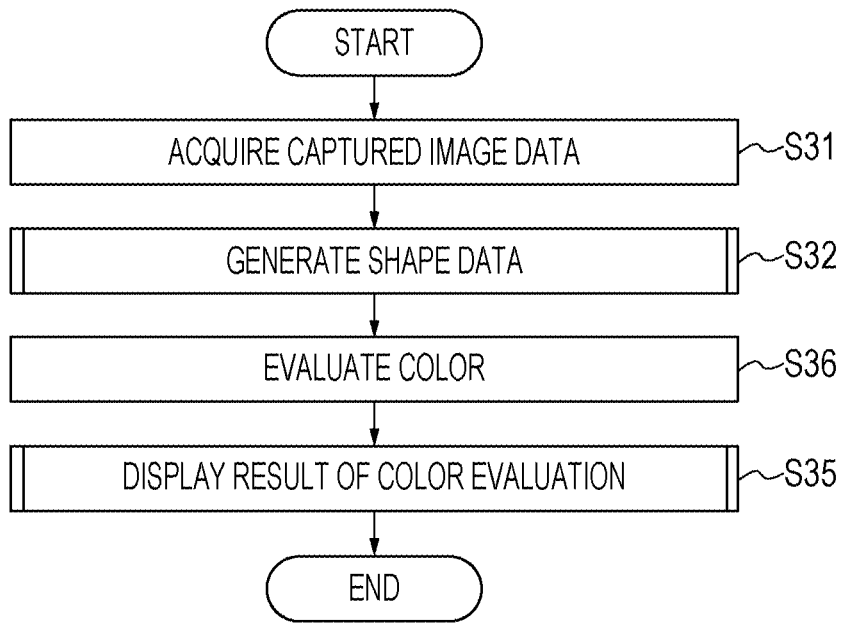
FIG. 3B is a flowchart illustrating a process executed by an image processing apparatus.
Figure 13B:
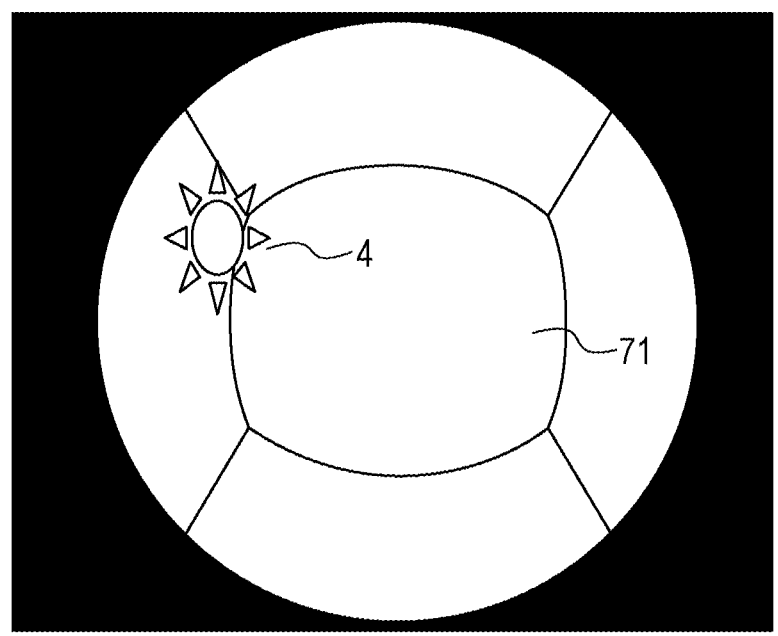
FIG. 13B is a diagram for explaining a method of generating light source data.

FIG. 3B is a flowchart illustrating a process executed by the image processing apparatus 1. Note that processes in S31, S32, and S35 are the same as the processes in S31, S32, and S35 according to the first embodiment, and thus a further description thereof is omitted. In the present embodiment, the processing in S243 in S34 is different from that in the first embodiment, and thus S243 will be described below. In S243, the color evaluation unit 24 acquires the light source data from the light source data storage unit 26. A method of generating light source data in advance is described below with reference to FIG. 13. In FIG. 13A, a ceiling 71 is a ceiling in an environment in which image capturing is performed. The image capturing apparatus 2 and the light source 4 are placed at the same positions as the positions at which they are placed when image capturing is performed by image capturing apparatus 2. An image capturing apparatus 7 is an image capturing apparatus provided with a fisheye lens. The image capturing apparatus 7 is placed in an upward attitude at a position where the object 3 is placed when image capturing by the image capturing apparatus 2 is performed. FIG. 13B shows an image obtained by performing image capturing under the condition shown in FIG. 13A. A method of calculating a light source vector is described below with reference to FIG. 7C. A circle 83 represents a mirror-shaped sphere 5 in a captured image, and indicates an angle of an azimuth direction where the light source exists with respect to the surface of the object 3. A semicircle 84 indicates an elevation direction angle in which the light source exists with respect to the surface of the object 3. The fish-eye lens included in the image capturing apparatus 7 is of an equidistant projection method, and thus, in the x and y directions, a position from the center of the circle 83 is projected as it is on the semicircle 84. In the z direction, the position is projected on a circle concentric with the circle 83 in the same angle as the semicircle 84. In the example shown in FIG. 7C, the light source 4 exists on a concentric circle, which is a second one as counted from an outermost one, of a total of nine concentric circles 83, and thus the light source 4 exists at a position in the z direction at 20°. Note that the calculation of zl in the present embodiment is performed using formula (10) instead of formula (1).

[Math. 7]

$$zl = \sin\theta \quad (10)$$

$$\theta = \frac{\pi}{2}\left(1 - \sqrt{xl^2 + yl^2}\big/r\right)$$

Effects of the Second Embodiment

As described above, the image processing apparatus according to the present embodiment obtains the color information of the reference plate using the light source data generated in advance, and evaluates the color of the object. Thus, it is possible to evaluate the color of the object regardless of the shape of the object or the image capturing condition.

Third Embodiment

In the first embodiment, the shape data is generated based on the captured image data, but the shape data may be generated based on CAD data. In a third embodiment described below, CAD data representing an approximate shape of the object 3 is acquired, and shape data generated based on the CAD data is used for color evaluation. The following description will focus on differences between the third embodiment and the first embodiment.

<Functional Configuration of Image Processing Apparatus 1>

Figure 14:
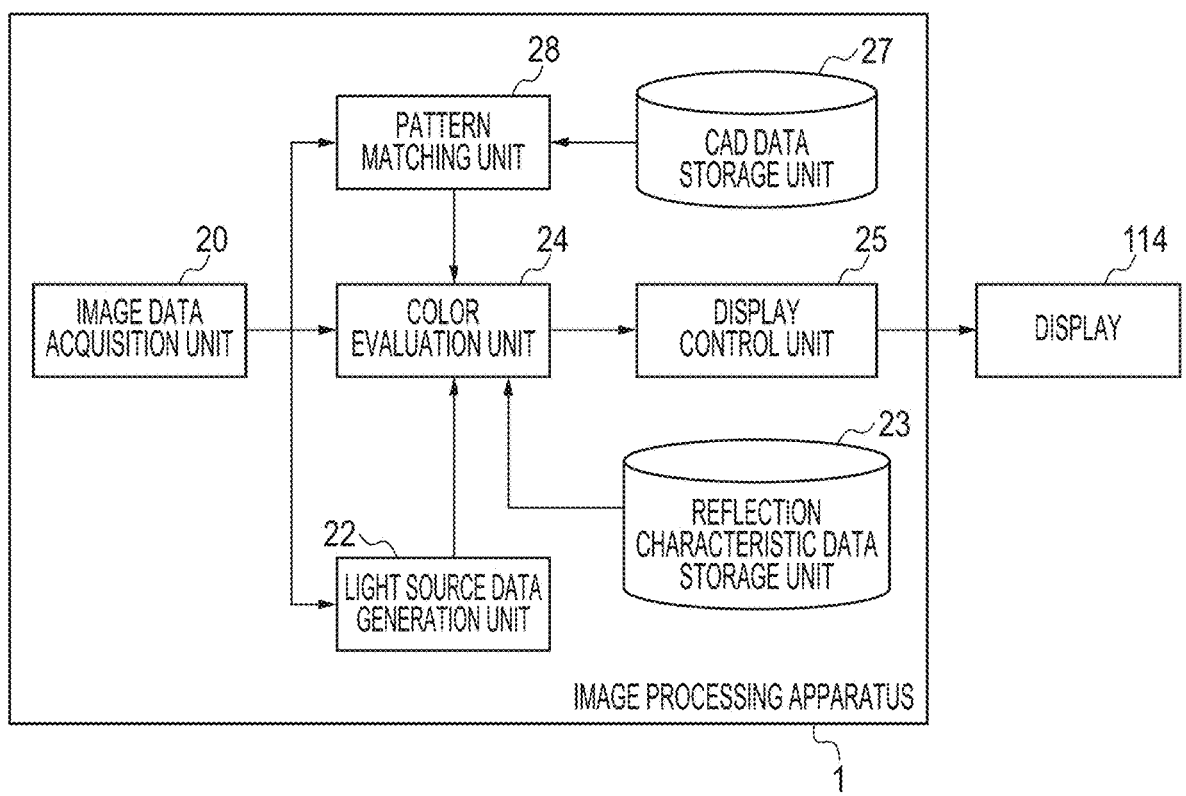
FIG. 14 is a diagram illustrating a functional configuration of an image processing apparatus.

FIG. 14 is a diagram illustrating a functional configuration of the image processing apparatus 1 according to the present embodiment. The image processing apparatus 1 includes an image data acquisition unit 20, a shape data generation unit 21, a light source data generation unit 22, a reflection characteristic data storage unit 23, a color evaluation unit 24, a display control unit 25, a CAD data storage unit 27, and a pattern matching unit 28. The CAD data storage unit 27 stores CAD data representing the general shape of the object 3. The pattern matching unit 28 performs pattern matching based on the captured image data and the CAD data and generates shape data.

<Process Executed by Image Processing Apparatus 1>

Figure 15:
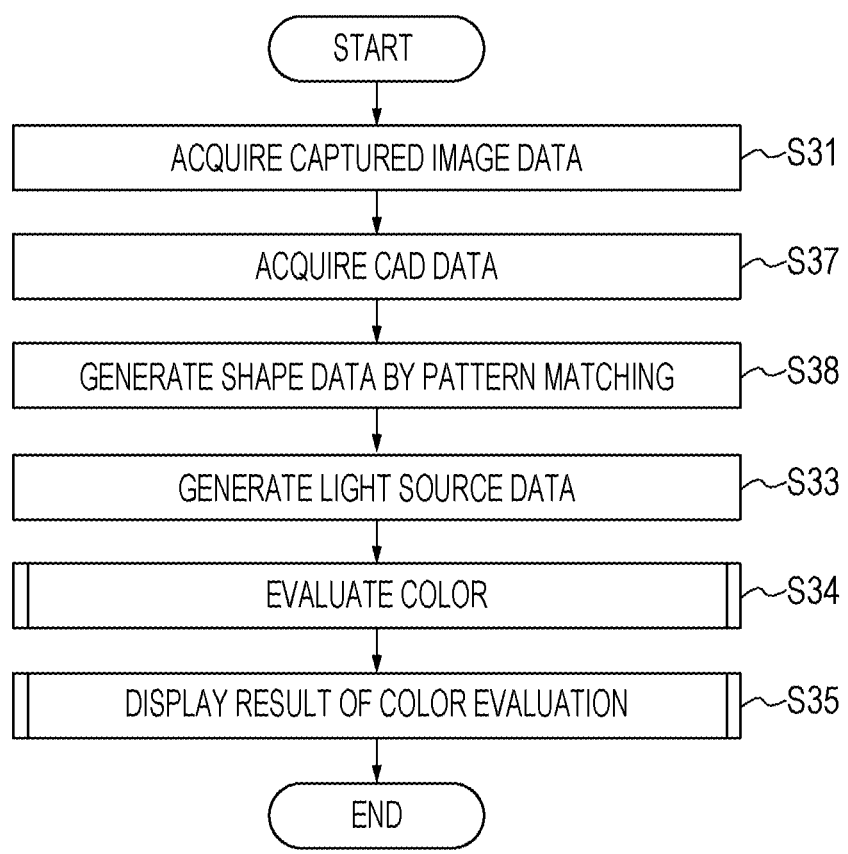
FIG. 15 is a flowchart illustrating a process executed by an image processing apparatus.

FIG. 15 is a flowchart illustrating a process executed by the image processing apparatus 1. Note that processes in S31, S33, S34, and S35 are the same as the processes in S31, S33, S34, and S35 according to the first embodiment, and thus a further description thereof is omitted.

Figure 16:
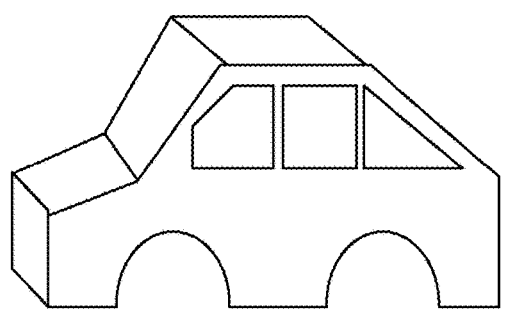
FIG. 16 is a diagram illustrating an example of CAD data.

In S38, the pattern matching unit 28 acquires the CAD data from the CAD data storage unit 27. FIG. 16 illustrates an example of CAD data. In the CAD data, the object 3 is composed of a plurality of polygons, and the CAD data includes three-dimensional coordinates of each vertex of the polygon. In S39, the pattern matching unit 28 performs pattern matching based on the captured image data and the CAD data and generates shape data. More specifically, first, an image of the object 3 at a virtual position and in a virtual attitude is simulated based on the CAD data. A process of determining whether or not a feature value of the captured image represented by the captured image data matches a feature value of the image obtained via the simulation match is performed repeatedly while changing the position and the attitude of the object 3. If good matching of the feature value is obtained for a simulation result for a particular position and attitude, then based on this simulation result, a correspondence relationship between the three-dimensional coordinates of the object 3 and each pixel of the captured image is calculated. Based on the calculated correspondence relationship, a normal vector corresponding to each pixel of the captured image is calculated, and shape data including normal vectors of the respective pixels is generated. The normal vector is obtained by calculating a normal of a polygon from three-dimensional coordinates of vertices of the polygon.

Effects of the Third Embodiment

As described above, the image processing apparatus according to the present embodiment acquires the color information of the reference plate using the shape data generated based on the CAD data, and evaluates the color of the object. Thus, it is possible to evaluate the color of the object regardless of the shape of the object or the image capturing condition.

Fourth Embodiment

In the first embodiment, the reflection characteristic of the reference plate represented in the RGB values is acquired. Instead, the spectral reflectance may be used in acquiring the reflection characteristic. By measuring the reflection characteristic of the reference plate represented by spectral reflectance, it becomes possible to evaluate the color of the object with high accuracy even when the light source used to measure the reflection characteristic is different from the light source used when the image of the object is captured. The following description will focus on differences between the present embodiment and the first embodiment.

<Reflection Characteristic Data>

Figure 18A:
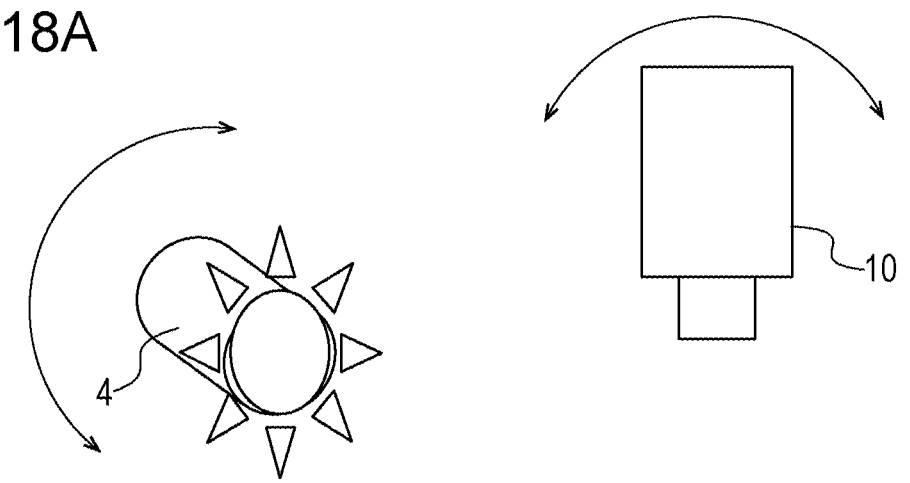
FIG. 18A is a diagram for explaining a method of measuring a spectral reflectance of a reference plate.
Figure 18B:
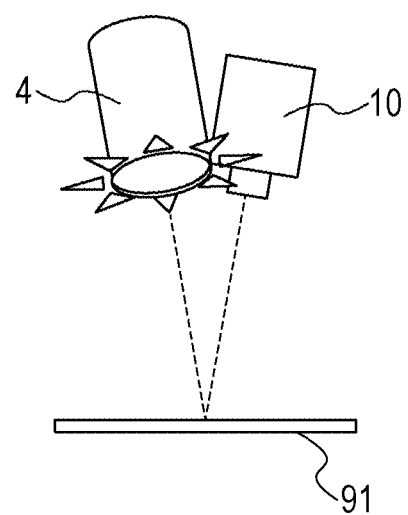
FIG. 18B is a diagram for explaining a method of measuring a spectral reflectance of a reference plate.

The reflection characteristic data storage unit 23 in the present embodiment stores the reflection characteristic data representing the spectral reflectance obtained by measuring the reference plate using a spectral reflection luminance meter. A method of measuring the spectral reflectance of the reference plate is described below with reference to FIG. 18. FIG. 18A illustrates the reference plate 91, the light source 4, and the spectral radiance meter 10. As in FIG. 10B, the light source 4 and the spectral radiance meter 10 are moved with respect to the reference plate 91 in steps of 10°, and the spectral radiance $P(\lambda)$ under each geometric condition is measured. As described above with reference to FIG. 18B, the light source 4 and the spectral radiance meter 10 are placed at a position in a substantially vertical direction with respect to the reference plate 91, and the spectral radiance $PW(\lambda)$ is measured. Thereafter, the spectral reflectance $\rho(\lambda)$ at each angle is calculated according to the following formula (11).

[Math. 8]

$$\rho(\lambda)=P(\lambda)/Pw(\lambda) \qquad (11)$$

The reflection characteristic data representing the calculated spectral reflectance is stored in the reflection characteristic data storage unit 23.

Figures 19, 20:
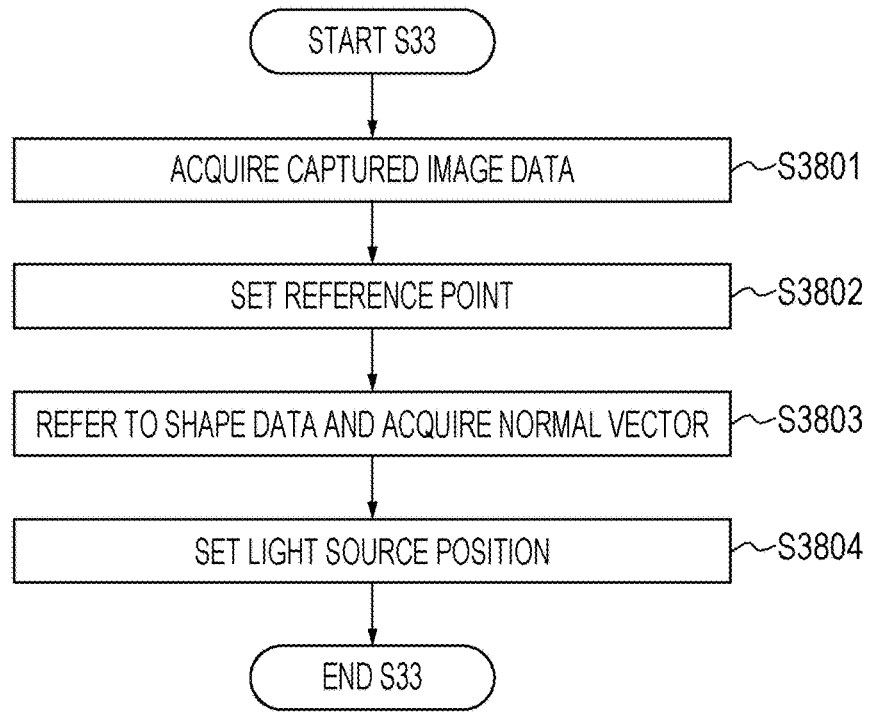
FIG. 19 is a diagram illustrating an example of reflection characteristic data.
FIG. 20 is a flowchart illustrating a process of generating light source data.

FIG. 19 shows an example of reflection characteristic data stored in the reflection characteristic data storage unit 23. As shown in FIG. 19, the reflection characteristic data represents the spectral reflectance for various wavelengths X in steps of 10 nm in a range from 380 nm to 730 nm and for various azimuth angles and elevation angles both in steps of 10°.

<Process Executed by Image Processing Apparatus 1>

Figure 17A:
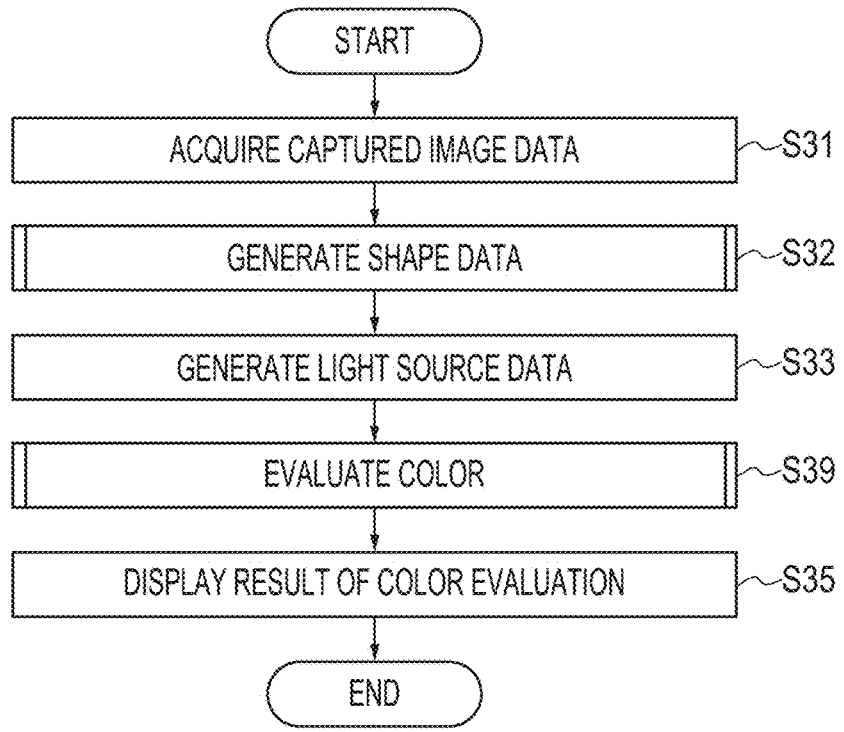
FIG. 17A is a flowchart illustrating a process executed by an image processing apparatus.

FIG. 17A is a flowchart illustrating a process executed by the image processing apparatus 1. Note that processes in S31, S32, S33, and S35 are the same as the processes in S31, S32, S33, and S35 according to the first embodiment, and thus a further description thereof is omitted.

Figure 17B:
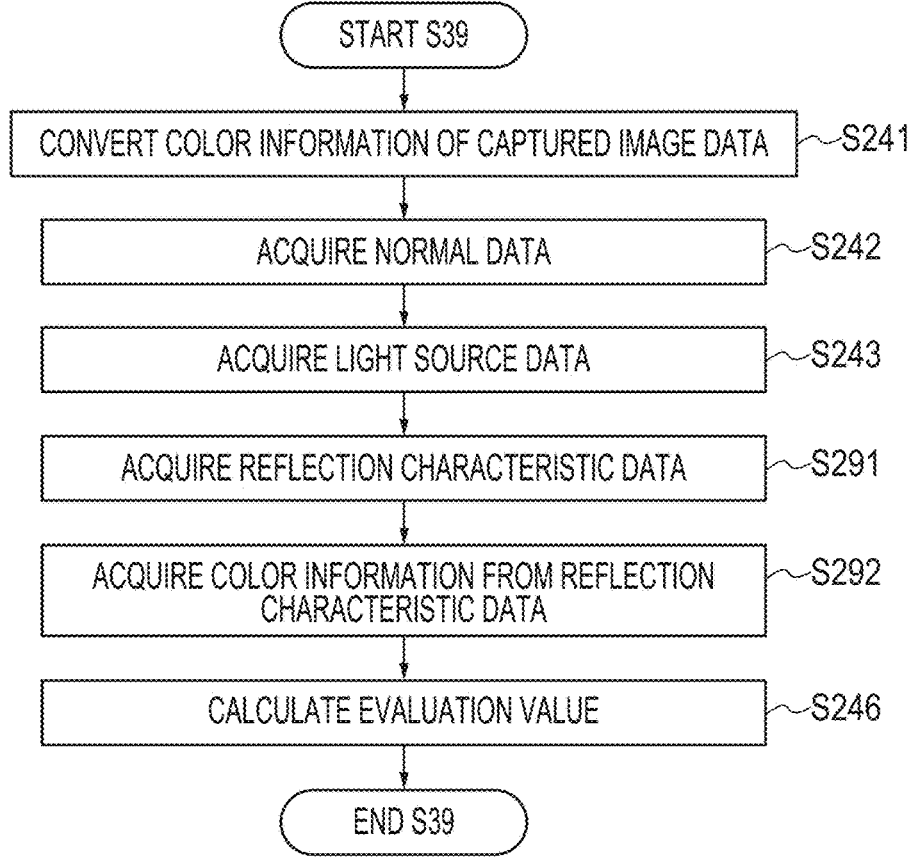
FIG. 17B is a flowchart illustrating a process executed by an image processing apparatus.

In S39, the color evaluation unit 24 evaluates a color of a surface of the object 3 based on the captured image data, the shape data, the light source data, and the reflection characteristic data. Details of the process in S39 are described below with reference to FIG. 17B. Note that processes in S241, S242, S243, and S246 are the same as the processes in S241, S242, S243, and S246 according to the first embodiment, and thus a further description thereof is omitted.

In S291, the color evaluation unit 24 acquires reflection characteristic data from the reflection characteristic data storage unit 23. This reflection characteristic data is obtained by measuring the spectral reflectance of the reference plate 91 as described above. In S292, the color evaluation unit 24 acquires, from the reflection characteristic data, the color information (the spectral reflectance) of the reference plate for comparison with the color information of an area corresponding to the evaluation area 43 of the captured image. First, as shown in FIG. 11A, the normal vector (xn, yn, zn) of a pixel in an area corresponding to the evaluation area 43 in the captured image, the light source vector (xl, yl, zl), and a vector (xc, yc, zc) representing the direction from the image capturing apparatus 2 to the object 3 are acquired. Hereinafter, the vector representing the direction from the image capturing apparatus 2 to the object 3 is referred to as an image capture direction vector. The normal vector (xn, yn, zn) is acquired from the shape data, and the light source vector (xl, yl, zl) is acquired from the light source data. The image capturing apparatus 2 is located directly opposed to the surface to be captured, and thus the image capture direction vector is given as (0, 0, −1). Next, as shown in FIG. 11B, a rotation matrix that rotates the normal vector so as to point directly upwards is calculated, and the light source vector and the image capture direction vector are rotated by the resultant rotation matrix. The resultant rotated light source vector is denoted as (xl', yl', zl'), and the resultant rotated image capture direction vector is denoted as (xc', yc', zc'). The reason why the normal vector is rotated into the directly upward direction is that when the image capturing for generating the reflection characteristic data is performed in a state where the normal of the surface of the reference plate points directly upward. Note that the normal vector points vertically upwards when the normal vector (xn, yn, zn) is (0, 0, $\sqrt{(xn^2+yn^2+zn^2)}$). From the reflection characteristic data, the spectral reflectance of the reference plate 91 is acquired for a particular case in which the image of the reference plate 91 is captured in a direction of the light source and an image capture direction respectively closest to (xl', yl', zl') and (xc', yc', zc'). Note that four pieces of spectral reflectance of the reference plate captured under similar image capturing conditions may be extracted from the reflection characteristic data, and the color information of the reference plate may be calculated using interpolation. Using the acquired spectral reflectance, the XYZ values are calculated according to formula (12). Note that the spectral radiance $P_1(\lambda)$ of the light source 4 and the color matching function (xe($\lambda$), ye($\lambda$), ze($\lambda$),) are set in advance.

[Math. 9]

$$\begin{cases} X = \int_{380}^{730} P_l(\lambda) \cdot \rho(\lambda) \cdot xe(\lambda) \cdot d\lambda \\ Y = \int_{380}^{730} P_l(\lambda) \cdot \rho(\lambda) \cdot ye(\lambda) \cdot d\lambda \\ Z = \int_{380}^{730} P_l(\lambda) \cdot \rho(\lambda) \cdot ze(\lambda) \cdot d\lambda \end{cases} \quad (12)$$

Effects of the Fourth Embodiment

As described above, the image processing apparatus according to the present embodiment acquires the color information of the reference plate using the reflection characteristic data representing the spectral reflectance of the reference plate, and evaluates the color of the object. Thus, it is possible to evaluate the color of the object regardless of the shape of the object or the image capturing condition. By using the spectral reflectance as the reflection characteristic, it becomes possible to evaluate the color of the object with high accuracy even when the light source used to measure the reflection characteristic is different from the light source used when the image of the object is captured.

Fifth Embodiment

In the first embodiment, the light source data is generated based on the captured image data. Instead, the light source data may be generated based on the position of the light source designated by a user. In a fifth embodiment described below, light source data is acquired according to an instruction given by the user, and the acquired light source data is used in the color evaluation. The fifth embodiment is described below while focusing differences between the fifth embodiment and the first embodiment.

<Process in S33>

In S33, the light source data generation unit 22 generates the light source data based on the instruction given by the user. Details of the process in S33 are described below with reference to FIG. 20.

Figure 21:
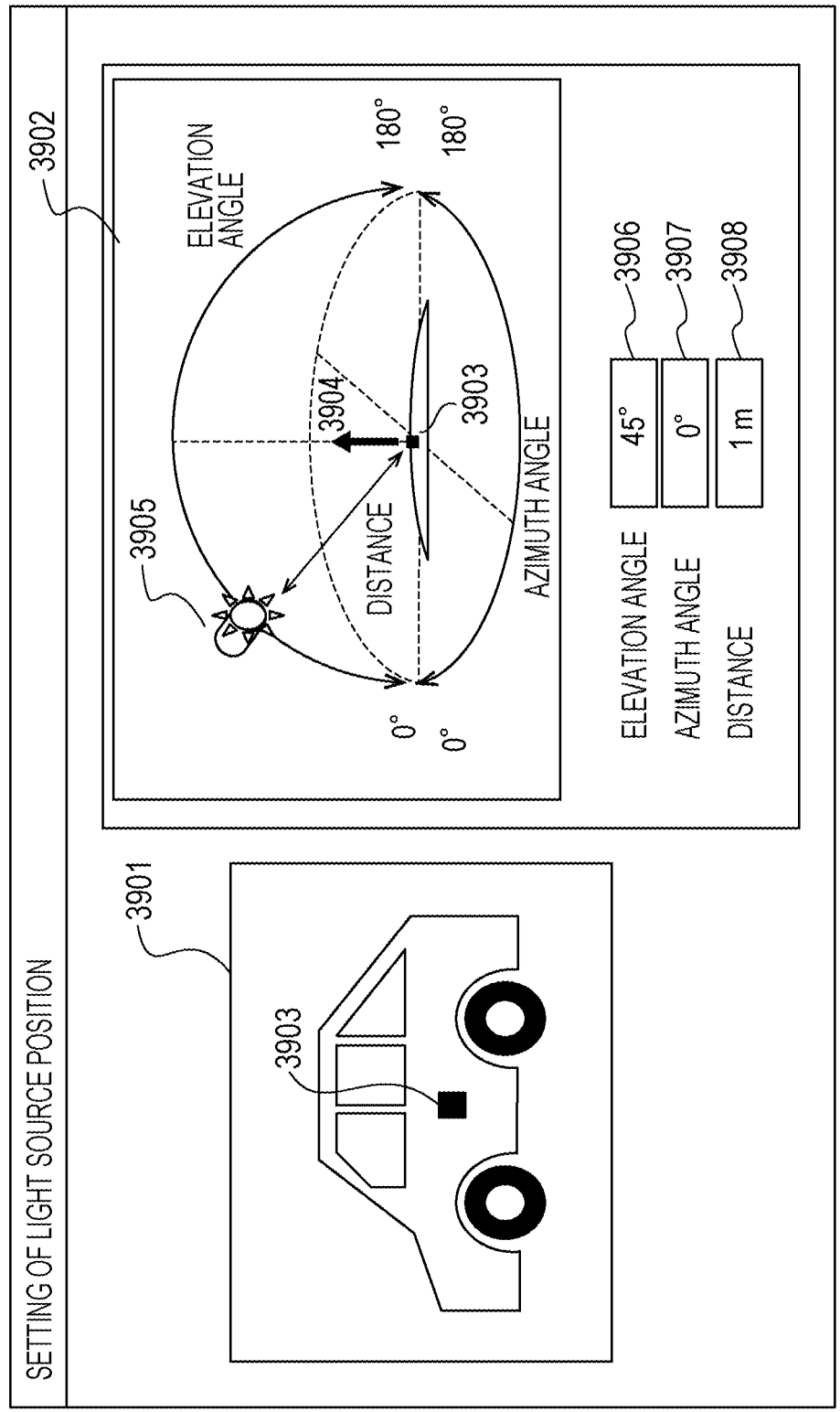
FIG. 21 is a diagram illustrating an example of a UI for designating a light source position.

In S3801, the light source data generation unit 22 acquires captured image data. Furthermore, a UI shown in FIG. 21 is displayed on the display. A captured image represented by the captured image data is displayed in an area 3901.

In S3802, the light source data generation unit 22 sets a reference point 3903 at a pixel on the object 3 that serves as a reference when the light source position is designated on the captured image displayed in the area 3901. The reference point 3903 can be arbitrarily determined as long as it is at a pixel whose normal vector can be calculated. In the present embodiment, a pixel corresponds to the center of the evaluation area 43 is used.

In S3803, the light source data generation unit 22 refers to the shape data generated in S32 and acquires the normal vector of the pixel set as the reference point 3903.

In S3804, the light source data generation unit 22 sets the light source position with reference to the normal vector 3904 acquired in S3803 with reference to the reference point 3903 set in S3802. In an area 3902 in the UI shown in FIG. 21, the reference point 3903, the normal vector 3904, and the light source 3905 are displayed three-dimensionally. In the state where this UI is displayed, the user is allowed to specify the light source position by dragging the light source 3905 within the area 3902 using the input device 110. That is, in S3804, the light source data generation unit 22 receives information designating the light source position from the user and generates light source data based on the designated light source position. The elevation angle of the light source position designated by the user is displayed in an area 3906, the azimuth angle is displayed in an area 3907, and the distance is displayed in an area 3908. Here, it is allowed to specify the azimuth angle in a range −180° to 180°, and the elevation angle in a range 0° to 180°. There is no specific restriction on the range of the distance. The distance may be set within a range in which the illumination does not cast a shadow when the image of the object 3 is captured and the distance is not to large which may cause the light amount to be insufficient. To set the light source position in more detail, the user may directly input numerical values in the regions 3906, 3907, and 3908. In a case where some candidates for the light source position with respect to the reference point 3903 are given, the user may select one of the candidates.

Effects of the Fifth Embodiment

As described above, the image processing apparatus according to the present embodiment acquires the color information of the reference plate using the light source data generated based on the light source position specified by a user, and evaluates the color of the object. Thus, it is possible to evaluate the color of the object regardless of the shape of the object or the image capturing condition.

(Modifications)

When the light source 4 is sufficiently far compared with the size of the object 3 and it can be regarded that the light source 4 is located in the same direction as the area corresponding to the object 3 in the captured image, the distance may not be displayed in the area 3908 and the display may not be input. In this case, it is allowed to set the light source position by moving the light source 4005 in an area 4002 of the UI shown in FIG. 22. The elevation angle is displayed in an area 4006, and the azimuth angle is displayed in an area 4007. In a case where the object 3 does not have anisotropy or the like, only a position in the vertical direction may be designated as the light source position.

Figure 22:
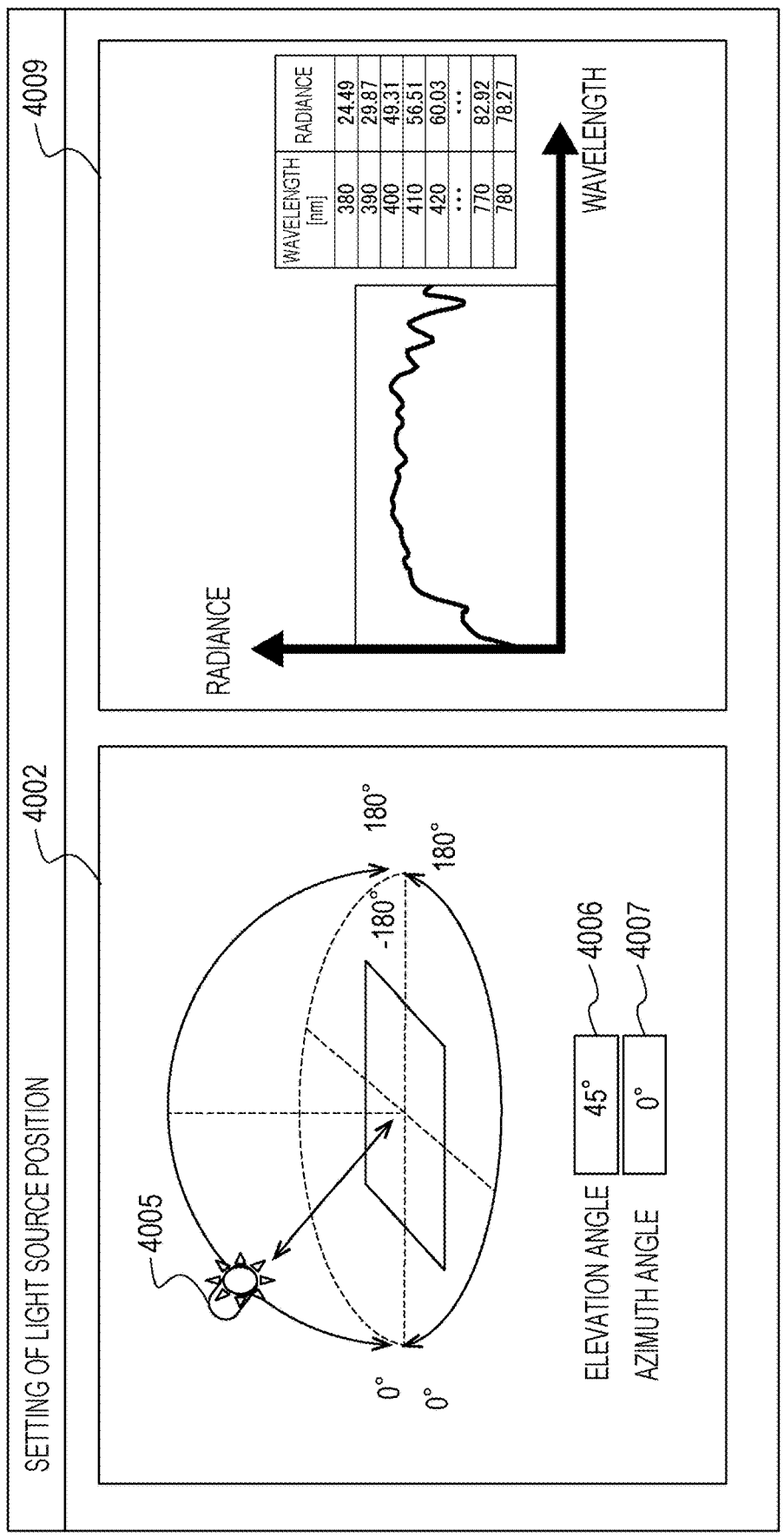
FIG. 22 is a diagram illustrating an example of a UI for designating a light source position.

Not only the position information of the light source but also color information such as spectral radiance may be input and combined with the fourth embodiment. For example, data of the radiance for various wavelengths may be input in an area 4009 as shown in FIG. 22.

OTHER EMBODIMENTS

The reflection characteristic data in the above-described embodiments includes the color information for respective various image capturing conditions, but the information related to the reflection characteristic is not limited to the above example. For example, information indicating the reflection characteristic may be a parameter of BRDF (Bi-directional Reflection Distribution Function).

According to the present invention, it is possible to evaluate a color of an object regardless of a shape of the object and an image capturing condition.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   one or more memories storing instructions;
   one or more processors executing the instructions to:
   illuminate a first object with a marker arranged therein with light emitted by a light source;
   capture with a capturing condition an image of the first object with the marker arranged therein;
   acquire first color information from the captured image of the first object;
   generate shape data representing a shape of the first object based on a portion of the captured image that corresponds to the marker;
   acquire second color information from plural pieces of color information of a second object based on the shape data and the capturing condition;
   output, as an evaluation value of a color of the first object, a color difference between a color represented by the first color information and a color represented by the second color information.

2. The image processing apparatus according to claim 1, wherein the second color information is acquired using a table holding a correspondence between each of a plurality of capturing conditions and each of the plural pieces of color information of the second object.

3. The image processing apparatus according to claim 2, wherein the table is a table obtained by capturing images of the second object under a plurality of capturing conditions.

4. The image processing apparatus according to claim 1, wherein the shape data is data representing a direction of a normal of the first object.

5. The image processing apparatus according to claim 1,
   wherein the capturing condition comprises light source data, and
   wherein execution of the stored instructions further causes the one or more processors to acquire light source data related to the light source.

6. The image processing apparatus according to claim 5, wherein the light source data is data representing a direction in which the light source illuminates the first object with light.

7. The image processing apparatus according to claim 5,
   wherein execution of the stored instructions further causes the one or more processors to generate the light source data based on the captured image, and
   wherein the acquiring of light source data includes acquiring the generated light source data.

8. The image processing apparatus according to claim 5, wherein the light source data is data generated based on a position of the light source specified by a user.

9. The image processing apparatus according to claim 1,
   wherein the first color information is acquired from a target region in the acquired image that corresponds to an area of the first object delineated by the marker.

10. The image processing apparatus according to claim 9,
    wherein the marker includes an area cut out for exposing a surface of the first object and
    wherein the area of the first object delineated by the marker corresponds to the exposed surface.

11. The image processing apparatus according to claim 1, wherein the second color information is a spectral reflectance of the second object.

12. The image processing apparatus according to claim 1, wherein the second color information is a parameter of a reflection characteristic of the second object.

13. The image processing apparatus according to claim 1, wherein the outputting includes displaying on a display unit of the evaluation value of the color of the first object.

14. The image processing apparatus according to claim 1, wherein the marker includes a plurality of marks, wherein the shape data is generated based on positions of the plurality of marks in an image obtained by capturing the plurality of marks.

15. An image processing method comprising:
    illuminating a first object with a marker arranged therein with light emitted by a light source;
    capturing with a capturing condition an image of the first object with the marker arranged therein;
    acquiring first color information from the captured image of the first object;
    generating shape data representing a shape of the first object based on a portion of the captured image that corresponds to the marker;
    acquiring second color information from plural pieces of color information of a second object based on the shape data and the capturing condition;
    outputting, as an evaluation value of a color of the first object, a color difference between a color represented by the first color information and a color represented by the second color information.

16. A non-transitory computer-readable storage medium storing instructions that, when executed by a computer, cause the computer to perform an image processing method, the image processing method comprising:
    illuminating a first object with a marker arranged therein with light emitted by a light source;
    capturing with a capturing condition an image of the first object with the marker arranged therein;
    acquiring first color information from the captured image of the first object;
    generating shape data representing a shape of the first object based on a portion of the captured image that corresponds to the marker;
    acquiring second color information from plural pieces of color information of a second object based on the shape data and the capturing condition;

outputting, as an evaluation value of a color of the first object, a color difference between a color represented by the first color information and a color represented by the second color information.

\* \* \* \* \*